(12) United States Patent
Yu et al.

(10) Patent No.: US 10,443,489 B2
(45) Date of Patent: Oct. 15, 2019

(54) ROTARY ENGINE HAVING COMBUSTION CONTROLLERS

(71) Applicant: LG ELECTRONICS INC., Seoul (KR)

(72) Inventors: Byeonghun Yu, Seoul (KR); Yunhi Lee, Seoul (KR); Changeon Lee, Seoul (KR); Byeongchul Lee, Seoul (KR); Kamgyu Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 318 days.

(21) Appl. No.: 15/382,859

(22) Filed: Dec. 19, 2016

(65) Prior Publication Data

US 2017/0184016 A1 Jun. 29, 2017

(30) Foreign Application Priority Data

Dec. 23, 2015 (KR) .................. 10-2015-0185404

(51) Int. Cl.
*F02B 55/08* (2006.01)
*F02B 53/04* (2006.01)
(Continued)

(52) U.S. Cl.
CPC ............... *F02B 55/08* (2013.01); *F01C 1/22* (2013.01); *F01C 19/025* (2013.01); *F02B 53/04* (2013.01);
(Continued)

(58) Field of Classification Search
CPC ........ F01C 19/00; F01C 19/08; F01C 19/025; F02B 2053/005; F02B 55/08; F28D 19/047
(Continued)

(56) References Cited

U.S. PATENT DOCUMENTS 3,311,094 A * 3/1967 Kehl ................. F02B 53/00
123/220
3,343,526 A * 9/1967 Peras ................ F01C 19/00
123/196 R
(Continued)

FOREIGN PATENT DOCUMENTS

JP         02-230922      9/1990
KR    10-2014-0022029     2/2014
KR    10-2015-0108852     9/2015

OTHER PUBLICATIONS

Korean Search Report dated Mar. 16, 2017 issued in Application No. PCT/KR2016/013092.
(Continued)

*Primary Examiner* — Phutthiwat Wongwian
*Assistant Examiner* — Edward Bushard
(74) *Attorney, Agent, or Firm* — KED & Associates, LLP

(57) ABSTRACT

A rotary engine including a housing having therein N lobe accommodating portions (N is a natural number equal to or greater than 3), and combustion chambers communicating with the lobe accommodating portions, respectively, a rotor having N−1 lobes eccentrically rotating centering on a center of the lobe accommodating portions, and consecutively accommodated in the respective lobe accommodating portions during the eccentric rotation, and combustion controllers provided at both sides of each combustion chamber, and configured to limit a combustion range of mixed gas.

19 Claims, 22 Drawing Sheets

(51) Int. Cl.
*F01C 1/22* (2006.01)
*F01C 19/02* (2006.01)
*F02B 53/00* (2006.01)

(52) U.S. Cl.
CPC ..... *F02B 2053/005* (2013.01); *F04C 2250/00* (2013.01); *Y02T 10/17* (2013.01)

(58) Field of Classification Search
USPC .......................................... 123/214; 418/215
See application file for complete search history.

(56) References Cited

U.S. PATENT DOCUMENTS

| | | | |
|---|---|---|---|
| 3,377,995 A | 4/1968 | De Coye De Castelet | |
| 3,384,055 A * | 5/1968 | Glenday | F02B 55/08 418/142 |
| 3,467,070 A * | 9/1969 | Green | F02B 53/00 123/229 |
| 3,797,464 A * | 3/1974 | Abbey | F01C 1/3566 123/229 |
| 3,872,838 A * | 3/1975 | Vogelsang | F01C 19/04 418/186 |
| 3,931,807 A * | 1/1976 | Bloom | F01C 1/3562 123/228 |
| 3,939,903 A * | 2/1976 | Sakaki | F28D 19/047 165/9 |
| 9,890,639 B2 * | 2/2018 | Broatch | F01C 1/103 |
| 2011/0247583 A1 | 10/2011 | Shkolnik et al. | |
| 2013/0139785 A1 | 6/2013 | Shkolnik et al. | |
| 2014/0003988 A1 * | 1/2014 | Shkolnik | F01C 1/22 418/142 |

OTHER PUBLICATIONS

European Search Report dated Aug. 13, 2019 issued in EP Application No. 16879178.8.

* cited by examiner (a) ROTATION ANGLE OF ROTOR 0°

(b) ROTATION ANGLE OF ROTOR 60°

(d) ROTATION ANGLE OF ROTOR 120°

(c) ROTATION ANGLE OF ROTOR 90°

(a) N=3

(b) N=4

(c) N=5

(d) N=6

ROTARY ENGINE HAVING COMBUSTION CONTROLLERS

CROSS-REFERENCE TO RELATED APPLICATION(S)

Pursuant to 35 U.S.C. § 119(a), this application claims the benefit of an earlier filing date of and the right of priority to Korean Application No. 10-2015-0185404, filed on Dec. 23, 2015, the contents of which are incorporated by reference herein in its entirety.

BACKGROUND

1. Field

This specification relates to a rotary engine producing driving force by a rotary motion.

2. Background

A rotary engine is an engine producing driving force by a rotary motion, and has first been invented by Wankel.

A Wankel engine invented by Wankel includes a housing having an inner surface in a shape of an epitrochoidal curve, and a rotor having a triangular shape rotating within the housing. An inner space of the housing is divided into three spaces by the rotor. As volumes of those spaces change in response to the rotation of the rotor, four strokes such as intake→compression→explosion→exhaust are executed in a continuous manner. In the Wankel engine, each stroke is executed three times and an eccentric shaft rotates three times for one rotation of the rotor.

After the invention of the Wankel engine, various studies for optimizing the design of the Wankel engine have been conducted, and shape-varied rotary engines are also under development.

The rotary engine is a high performance engine in view of facilitating size reduction owing to a simple structure and exhibiting high performance or high output during a high-speed operation. By virtue of those advantages, the rotary engine is effectively applicable to various devices, such as a heat pump system, a vehicle, a bicycle, an aircraft, a jet ski, an electrical chain saw, a drone and the like.

In addition, the rotary engine generates less vibration and noise resulting from a uniform rotational force, and emits less NOx. However, as the rotary engine has a wider surface area than a stroke volume, an extinction area increases. Accordingly, the rotary engine emits a large quantity of unburned hydrocarbon (UHC) and causes lowered fuel efficiency and operation efficiency.

Various studies are undergoing in relation to overcoming the problems and improving performance of the rotary engine. One related example may be a rotary engine disclosed in Korean Patent Laid-open Publication No. 10-2014-0022029 titled "Cycloidal rotor engine."

A shape of a rotor of the rotary engine is decided by Equation 1 (see paragraph [0036]). However, as can be seen in Equation 1, each of x and y coordinates is decided by a combination of three factors. Hence, designs for inner shapes of the rotor and a housing related to the rotor may be slightly complicated.

Meanwhile, the rotary engine includes a piston that is movable into and out of a combustion chamber according to a rotation angle of the rotor, and a controller controlling the piston. With the configuration, a combined volume of an operation chamber and the combustion chamber is uniformly maintained in correspondence to the rotation angle of the rotor.

However, for the rotary engine, force is applied to push the piston during the compression, and accordingly additional operations are needed. This causes a limit in increasing efficiency of the engine. Also, similar to an existing rotary engine, the rotary engine makes a narrow long stroke volume during a combustion period. Therefore, such structure of the rotary engine is hardly understood as a structure capable of fundamentally solving an excessive emission of unburned gas.

SUMMARY OF THE INVENTION

Therefore, an aspect of the detailed description is to provide a rotary engine with a novel structure.

Another aspect of the detailed description is to provide a rotary engine capable of solving an excessive emission of unburned gas, which is caused in an existing rotary engine, and enhancing efficiency.

Another aspect of the detailed description is to provide a rotary engine with a new shape.

Another aspect of the detailed description is to provide conditions for optimally designing a housing and a rotor.

To achieve these and other advantages and in accordance with the purpose of this specification, as embodied and broadly described herein, there is provided a rotary engine including, a housing having therein N lobe accommodating portions (N is a natural number equal to or greater than 3), and combustion chambers communicating with the lobe accommodating portions, respectively, a rotor having N−1 lobes each eccentrically rotating centering on a center of the lobe accommodating portion, the N−1 lobes consecutively accommodated in the respective lobe accommodating portions during the eccentric rotation, and combustion controllers provided at both sides of each combustion chamber, and configured to limit a combustion range of mixed gas.

Each of the combustion chamber may be formed in a recessed shape on an upper central portion of the lobe accommodating portion.

Each of the combustion controllers may include a mounting portion formed within the housing and communicating with the corresponding lobe accommodating portion, and a control unit disposed in the mounting portion and having a part protruding into the lobe accommodating portion and inserted into the mounting portion, the control unit brought into contact with the lobe during compression and expansion processes to limit the combustion range of the mixed gas.

The mounting portion may include an accommodating groove defining a space for accommodating the control unit therein, and a communicating hole communicating the accommodating groove and the lobe accommodating portion with each other such that the part of the control unit protrudes into the lobe accommodating portion, the communicating hole having a smaller cross section than the accommodating groove.

The control unit may include a moving member disposed in the accommodating groove and having a part protruding into the lobe accommodating portion and inserted into the accommodating groove through the communicating hole, the moving member brought into contact with the lobe during the compression and expansion processes to maintain an airtight state, and an elastic supporting member supported on the accommodating groove and elastically pressing the moving member toward the lobe accommodating portion.

The moving member may extend in a thickness direction of the rotor.

The moving member may include a base portion formed in a plate-like shape and locked on an inner side wall of the accommodating groove while moving in response to being pressed by the elastic supporting member, and a protruding portion formed in a manner of protruding from the base portion, the protruding portion protruding into the lobe accommodating portion and inserted into the accommodating groove through the communicating hole.

The base portion may be locked on the inner side wall of the accommodating groove and the protruding portion may protrude the most into the lobe accommodating portion, while the moving member is not brought into contact with the lobe.

The elastic supporting member may be interposed between the base portion and an inner side surface of the accommodating groove to elastically support the moving member.

The elastic supporting member may be a plate spring formed in a shape convex toward the base portion.

The moving member may further include an air hole formed through the protruding portion, and a cover disposed on the protruding portion to selectively open and close the air hole according to a pressure difference.

The cover may be disposed on one surface of the protruding portion, adjacent to the combustion chamber, such that mixed gas present at an opposite side of the combustion chamber, divided based on the control unit, flows toward the combustion chamber during a compression process.

The cover may be disposed on the protruding portion in a rotatable manner.

The rotary engine may further include an intake-side housing cover coupled to the housing to cover one side of each of the lobe accommodating portions and connected to an intake manifold through which the mixed gas is introduced, and an exhaust-side housing cover coupled to the housing to cover another side of each of the lobe accommodating portions and connected to an exhaust manifold through which exhaust gas is discharged.

The mixed gas present at the opposite side of the combustion chamber, divided based on the control unit, may flow toward the combustion chamber through a gap between the intake-side housing cover and the housing and a gap between the exhaust-side housing cover and the housing during the compression process.

The rotary engine may further include a guide gear fixed to the intake-side housing cover and guiding the eccentric rotation of the rotor, a rotor gear disposed on the rotor and rotatable with being internally engaged with the guide gear, and a crankshaft disposed in a manner of being eccentric from a central portion of the rotor and transferring generated driving force to another system.

In addition, the present invention may provide a rotary engine including a housing provided therein with N lobe accommodating portions (N is a natural number equal to or greater than 3), and combustion chambers communicating with the lobe accommodating portions, respectively, and a rotor having the following outer shape, and provided with N−1 lobes each eccentrically rotating centering on a center of the lobe accommodating portion, the N−1 lobes consecutively accommodated in the respective lobe accommodating portions during the eccentric rotation.

The outer shape of the rotor many be generated as an epitrochoidal curve that is a curve drawn by an arbitrary point existing at a position spaced apart from a center of a rolling circle with a radius of r by a distance E while the rolling circle rolls along an outer circumference of a base circle with a radius of R. The outer shape of the rotor may be decided by the following equation, $$Ro(\alpha) = \begin{bmatrix} R(\alpha)\sin(\theta(\alpha)) \\ R(\alpha)\cos(\theta(\alpha)) \\ 1 \end{bmatrix}$$

$$\theta(\alpha) = \tan^{-1}\left(\frac{E\sin(N\alpha) + R_L\sin(\alpha)}{E\cos(N\alpha) + R_L\cos(\alpha)}\right)$$

$$R(\alpha) = \sqrt{(E\cos(3\alpha) + R_L\cos(\alpha))^2 + (E\sin(3\alpha) + R_L\sin(\alpha))^2}$$

where $\theta(\alpha)$ denotes a rotated angle of the arbitrary point centering on a y-axis setting the center of the base circle as an origin of a coordinate axis, $\alpha$ denotes a rotated angle of the center of the rolling circle centering on the y-axis, $R(\alpha)$ denotes a distance between the center of the base circle and the arbitrary point, $R_L$ denotes R+r, and N=(R+r)/r.

$R_L/E$ may preferably be equal to or greater than 6 ($R_L/E=6$), under assumption that a distance between the center of the rotor and the center of the lobe accommodating portion is E, and a distance between the center of the rotor and an outer surface of the rotor spaced the farthest apart from the center of the rotor.

A first storage portion for temporarily storing introduced mixed gas may be formed in a front portion of the rotor, a second storage portion for temporarily storing exhaust gas generated after combustion may be formed in a rear portion of the rotor, and an intake port and an exhaust port may be formed through a side portion of the rotor. Here, the intake port may communicate with the first storage portion such that the introduced mixed gas is introduced into the first storage portion, and the exhaust port may communicate with the second storage portion such that the exhaust gas generated after the combustion is introduced into the second storage portion.

The exhaust port may be located at a position where introduced gas is exhausted after being expanded to a greater amount.

The value N may be 3.

One of the lobes provided in the rotor may be accommodated in each of the lobe accommodating portions when the rotor rotates by 0°, 120° and 240°. The intake port may be located at a position where the mixed gas is introduced while the rotor rotates by 120°, and the exhaust port may be located at a position where the exhaust gas is exhausted after the rotor rotates by 270° to allow an overexpansion.

The rotary engine may further include combustion controller provided at both sides of each of the combustion chambers. Each of the combustion controllers may include a mounting portion disposed within the housing and communicating with the lobe accommodating portion, and a control unit disposed in the mounting portion and having a part protruding into the lobe accommodating portion and inserted into the mounting portion, the control unit brought into contact with the lobe during compression and expansion processes to limit the combustion range of the mixed gas.

The control unit may be brought into contact with the lobe while the rotor eccentrically rotates in the range of 160° to 200°.

Also, the present invention may provide a rotary engine, including a housing provided therein with N lobe accommodating portions (N is a natural number equal to or greater than 3), combustion chambers communicating with the lobe accommodating portions, respectively, and mounting portions provided at both sides of each combustion chamber and communicating with the lobe accommodating portion corresponding to the combustion chamber, a rotor having N−1 lobes each eccentrically rotating centering on a center of the lobe accommodating portion, the N−1 lobes consecutively accommodated in the lobe accommodating portions during the eccentric rotation, an intake-side housing cover coupled to the housing to cover one side of each of the lobe accommodating portions and having an intake hole for an introduction of mixed gas, an intake manifold coupled to the intake-side housing cover to communicate with the intake hole, the intake manifold allowing the introduction of the mixed gas, an exhaust-side housing cover coupled to the housing to cover another side of each of the lobe accommodating portions and having an exhaust hole for discharging exhaust gas, an exhaust manifold coupled to the exhaust-side housing cover to communicate with the exhaust hole, the exhaust manifold allowing the discharge of the exhaust gas, a guide gear fixed to the intake-side housing cover and guiding the eccentric rotation of the rotor, a rotor gear disposed on the rotor and rotating with being internally engaged with the guide gear, a crankshaft disposed in a manner of being eccentric from a central portion of the rotor and transferring generated driving force to another system, and control units each configured to protrude into the lobe accommodating portion and be inserted into the mounting portion, and brought into contact with the lobe during compression and expansion processes to limit a combustion range of the mixed gas.

In the present invention, combustion controllers may be provided at both sides of each combustion chamber that is located at an upper central portion of each lobe accommodating portion, to limit a combustion range of mixed gas. As such, the present invention provides a rotary engine with a new structure having the combustion controllers.

A control unit provided in each of the combustion controllers may be brought into contact with a lobe during compression and expansion, so as to limit the combustion range of the mixed gas. Therefore, an internal surface area of a housing corresponding to a stroke volume can be reduced during a combustion process, thereby reducing an amount of unburned gas generated.

In addition, a moving member provided in each of the combustion controllers may be movable in a bidirectional manner by pressing force of a rotor and elastic restoring force of an elastic supporting member. The moving member may be configured such that mixed gas present at an opposite side of a combustion chamber, divided based on the moving member, can flow toward the combustion chamber according to a pressure difference during a compression process. As such, the combustion controller disclosed herein can have an advantage in the aspect of no-need of separate driving force.

The combustion controller disclosed herein may be configured such that mixed gas present at an opposite side of the combustion chamber, divided based on the moving member, can flow toward the combustion chamber even though the moving member is brought into contact with the rotor. In detail, in a basic control unit, unburned mixed gas can flow through a gap between an intake-side housing cover and the moving member and a gap between an exhaust-side housing cover and the moving member according to a pressure difference. On the other hand, in a check valve-type control unit, a cover may be configured to selectively open and close an air hole formed through a protruding portion of the moving member according to a pressure difference, such that the unburned mixed gas present at the opposite side of the combustion chamber can flow toward the combustion chamber through the air hole.

Specifically, the check valve-type control unit can have an advantage, compared with the basic control unit, in that unburned gas partially generated at a side of the combustion chamber is prevented from flowing to the opposite side of the combustion chamber by virtue of the cover. As such, the check valve-type control unit can much more reduce an amount of unburned gas generated that the basic control unit, and can execute combustion similar to actual constant volume combustion.

In the rotary engine disclosed herein, intake port and exhaust port provided on the rotor may be located at positions where introduced gas can be exhausted after being expanded to a greater amount, thereby acquiring an overexpansion effect that an expansion ratio is greater than a compression ratio. Efficiency of the rotary engine can thus be improved by combination of such overexpansion effect with an effect of limiting a volume of an operation chamber by the combustion controller during a combustion period.

Meanwhile, according to the present invention, an outer shape of the rotor and a shape of a lobe accommodating portion can be decided by more simplified equations and a new type of rotary engine having rotor and housing with the thusly-formed shapes can be provided.

Upon designing the rotary engine according to the present invention, it may be advantageous to decrease a ratio of E and $R_L$ as important variables deciding the shapes of the rotor and the lobe accommodating portion, and preferable to set the ratio to be more than 1:6 which is the minimum ratio for designing the engine. For reference, the state that the ratio of $E:R_L$ is 1:6 ($R_L/E=6$) may correspond to the optimal design condition.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The embodiments will be described in detail with reference to the following drawings in which like reference numerals refer to like elements wherein:

The accompanying drawings, which are included to provide a further understanding of the invention and are incorporated in and constitute a part of this specification, illustrate exemplary embodiments and together with the description serve to explain the principles of the invention.

In the drawings:

FIGS. 1A and 1B are perspective views illustrating a rotary engine in accordance with one embodiment of the present invention, viewed from different directions;

FIG. 2 is an exploded perspective view of the rotary engine illustrated in FIG. 1A;

FIG. 3 is a conceptual view illustrating an internal structure of the rotary engine illustrated in FIG. 1A;

FIGS. 4A and 4B are perspective views of a rotor illustrated in FIG. 2, viewed from different directions;

FIG. 5 is a conceptual view illustrating an intake process of the rotary engine illustrated in FIG. 3;

FIG. 6 is a conceptual view illustrating a compression process of the rotary engine illustrated in FIG. 3;

FIG. 7 is a conceptual view illustrating an explosion process of the rotary engine illustrated in FIG. 3;

FIG. 8 is a conceptual view illustrating an exhaust process of the rotary engine illustrated in FIG. 3;

FIG. 9 is a conceptual view illustrating an epitrochoidal shape;

FIG. 10 is a conceptual view illustrating a design for an outer shape of the rotor illustrated in FIG. 2;

FIGS. 11 and 12 are conceptual views illustrating a design for a shape of a lobe accommodating portion illustrated in FIG. 2;

Figure 1A:
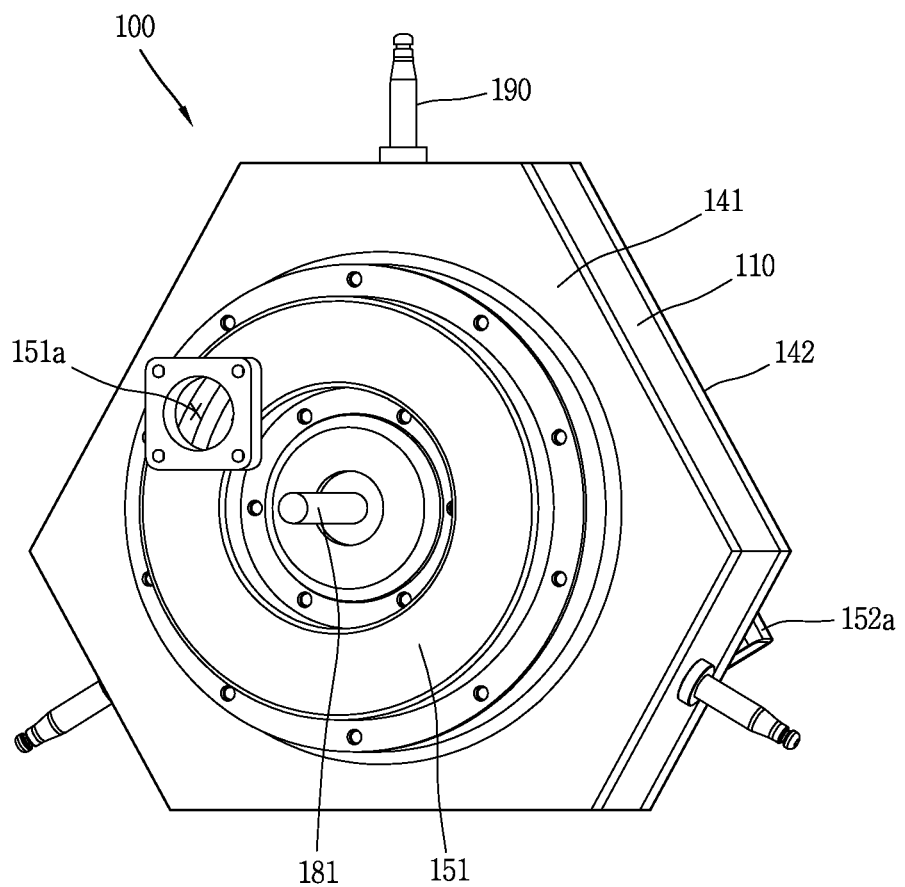
Figure 3:
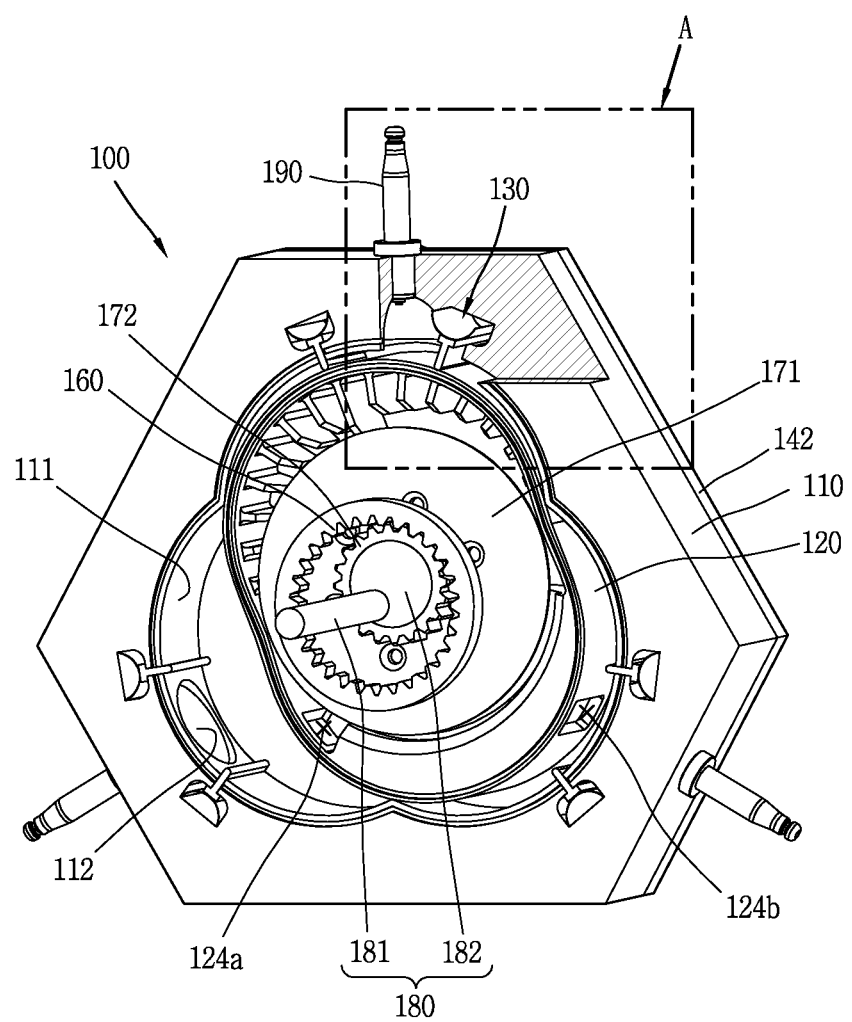
Figure 13:
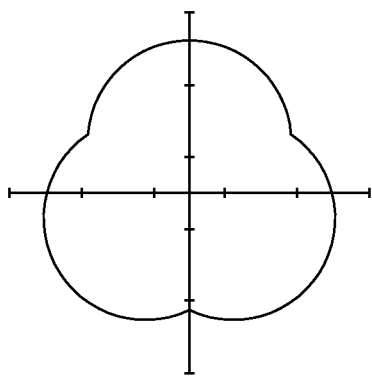
Figure 13:
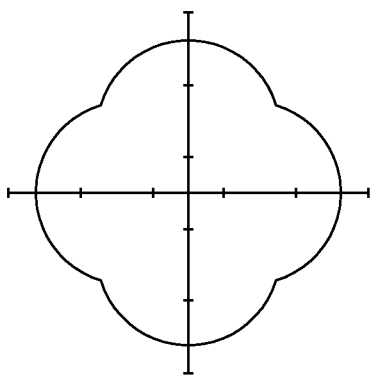
Figure 13:
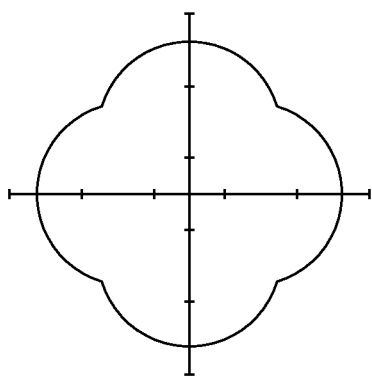
Figure 13:
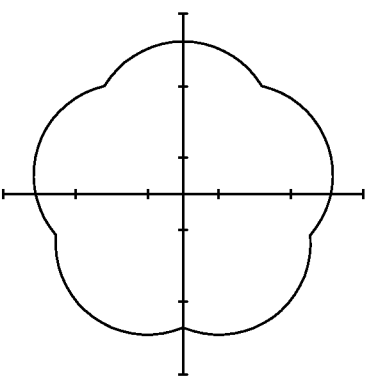
Figure 14:
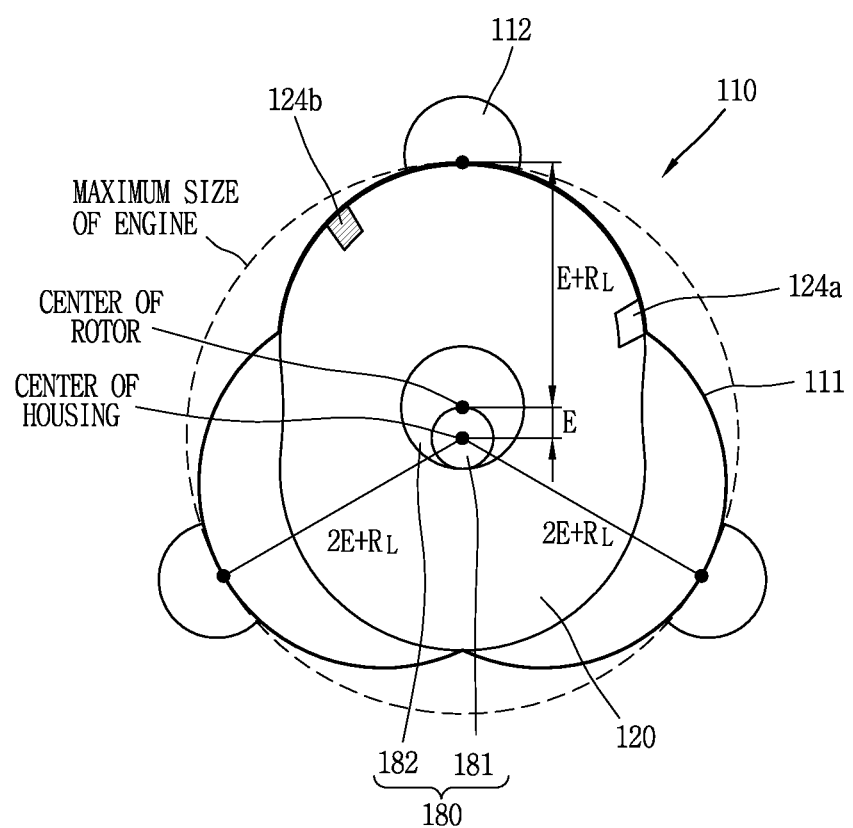
Figure 15:
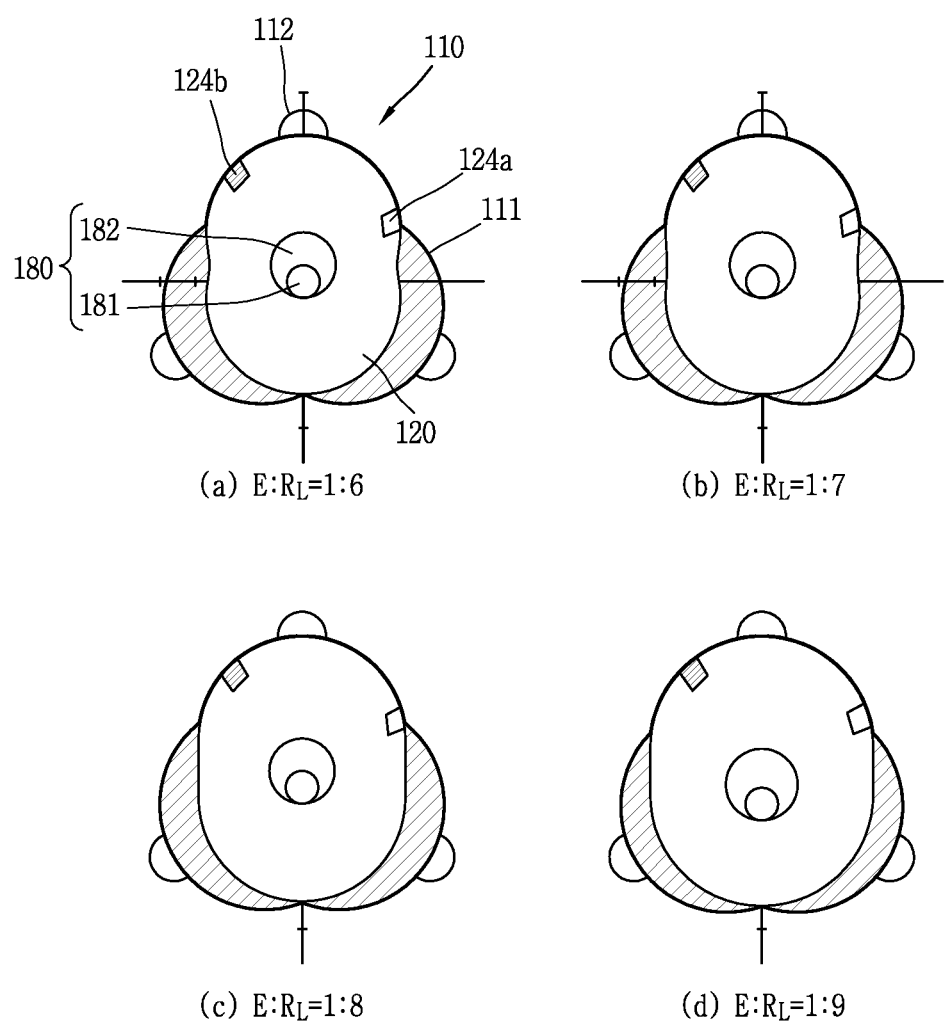
Figure 16:
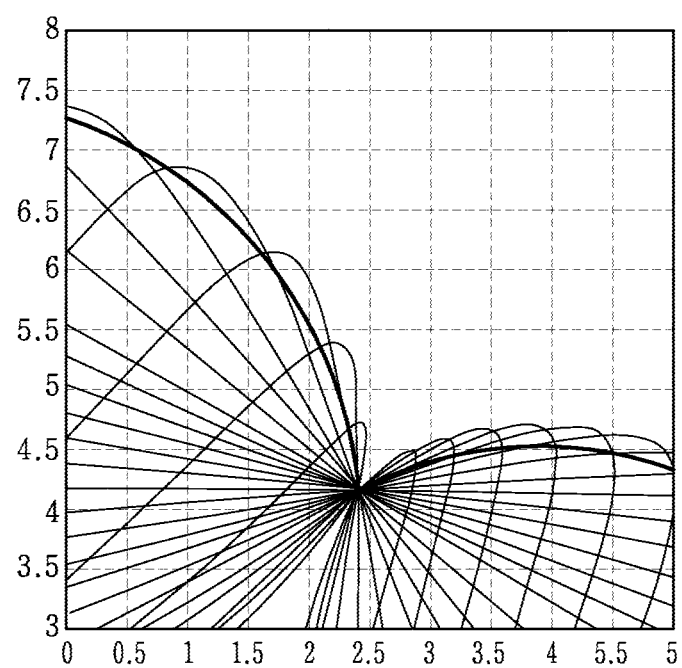
Figure 17:
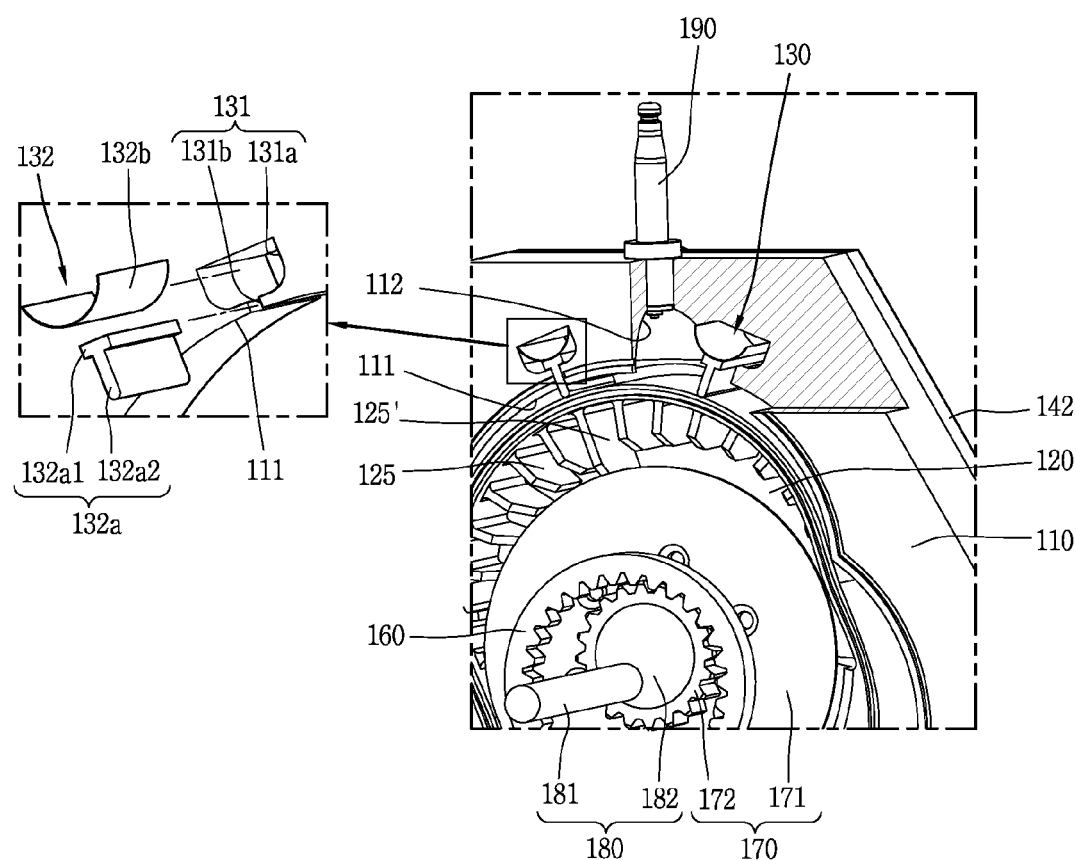
Figure 18:
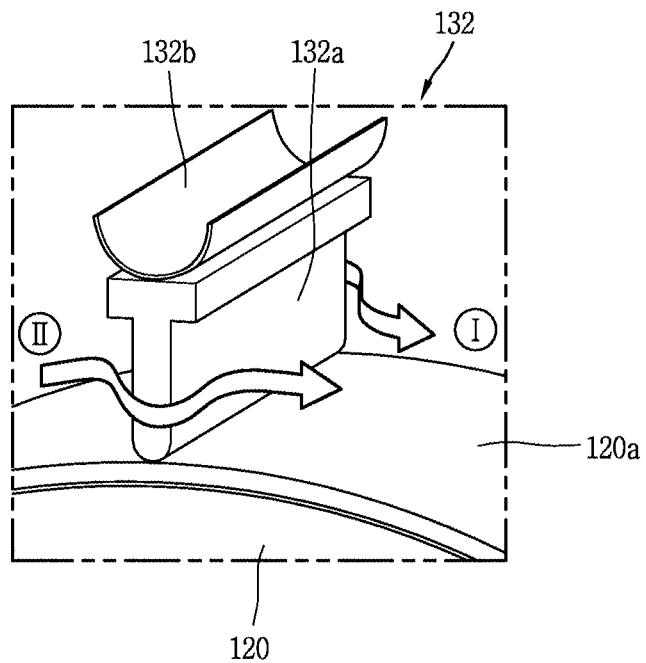
Figure 19:
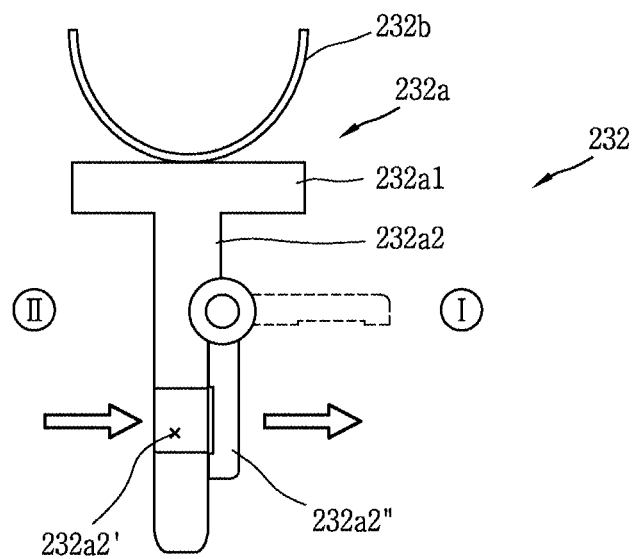
Figure 20:
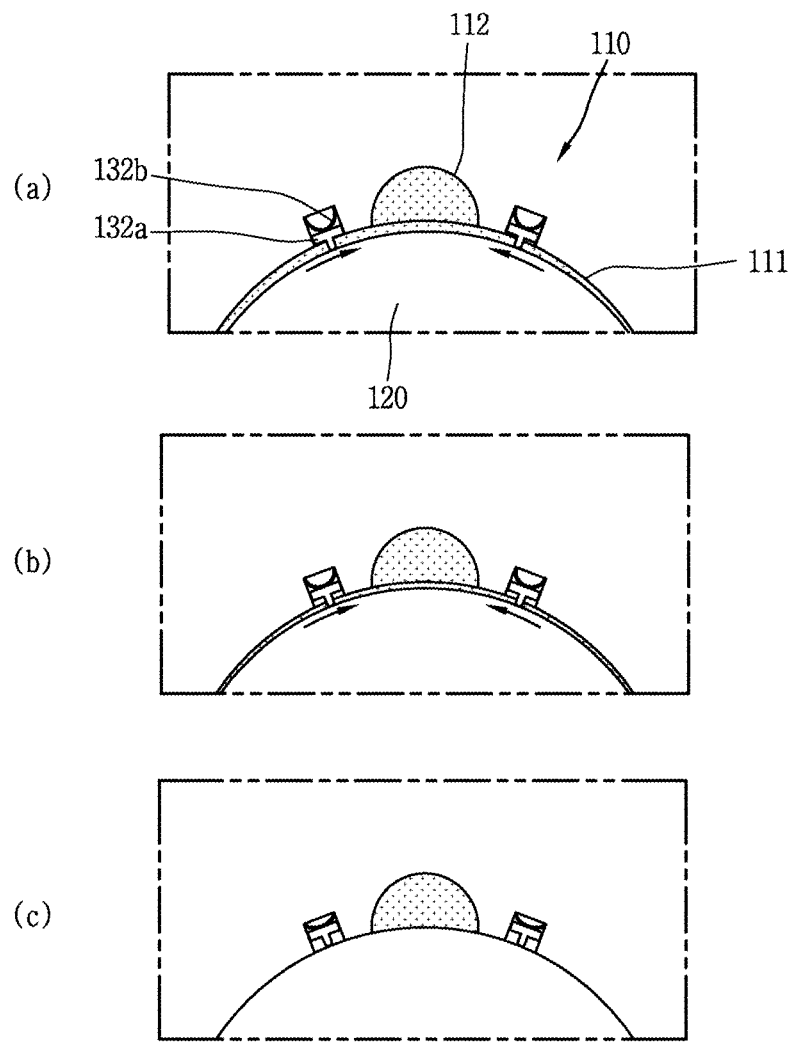
Figure 21:
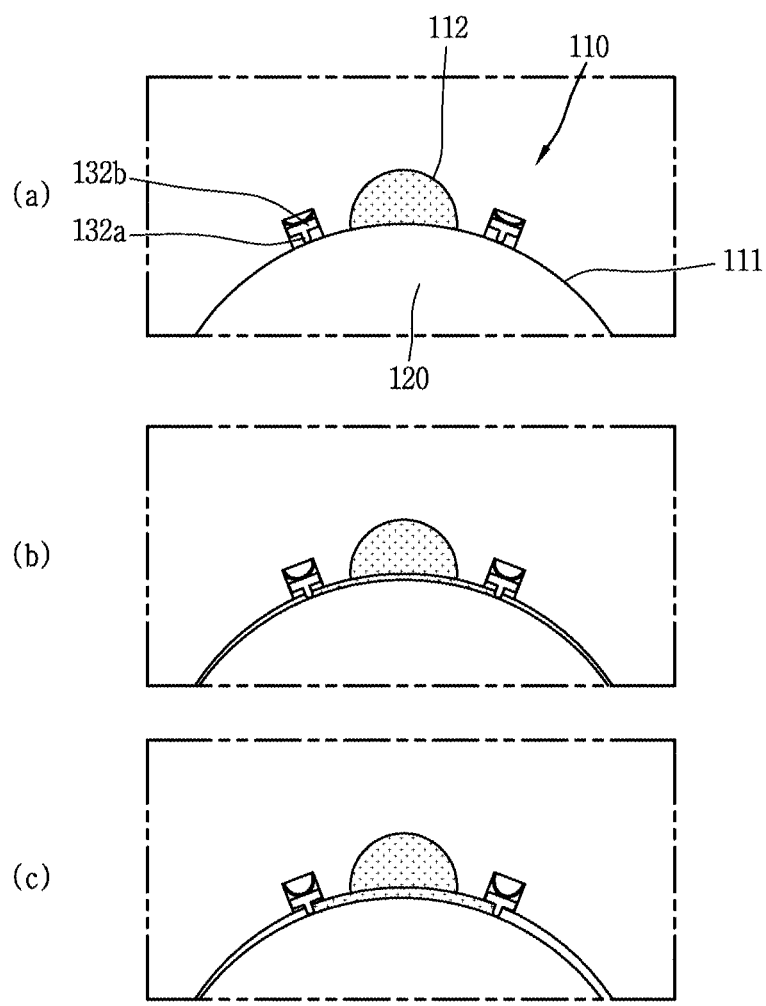
Figure 22:
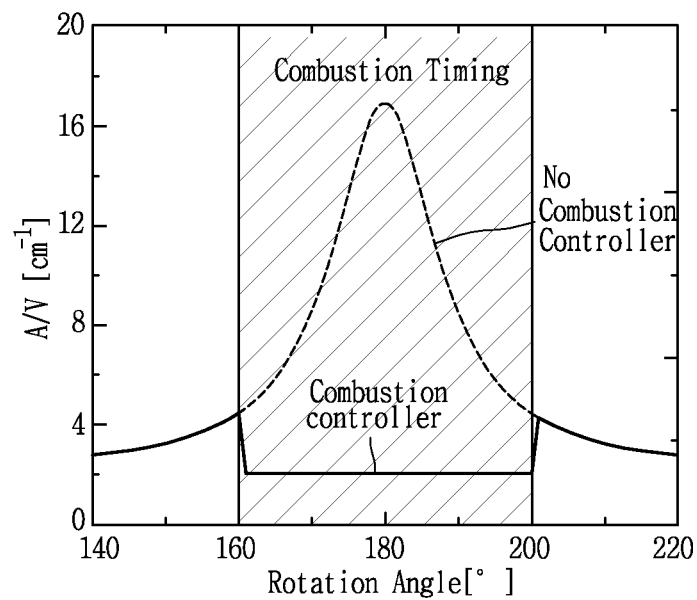
Figure 23:
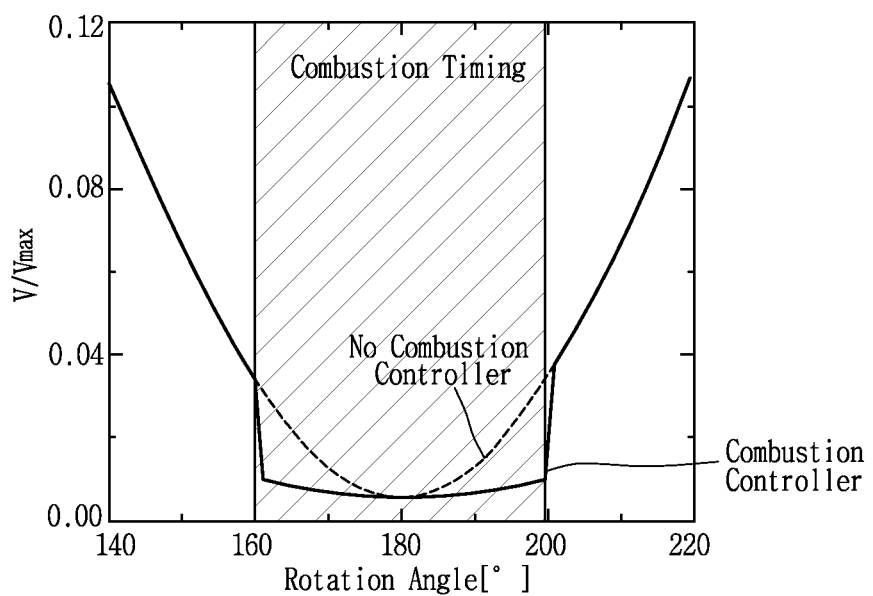
Figure 24:
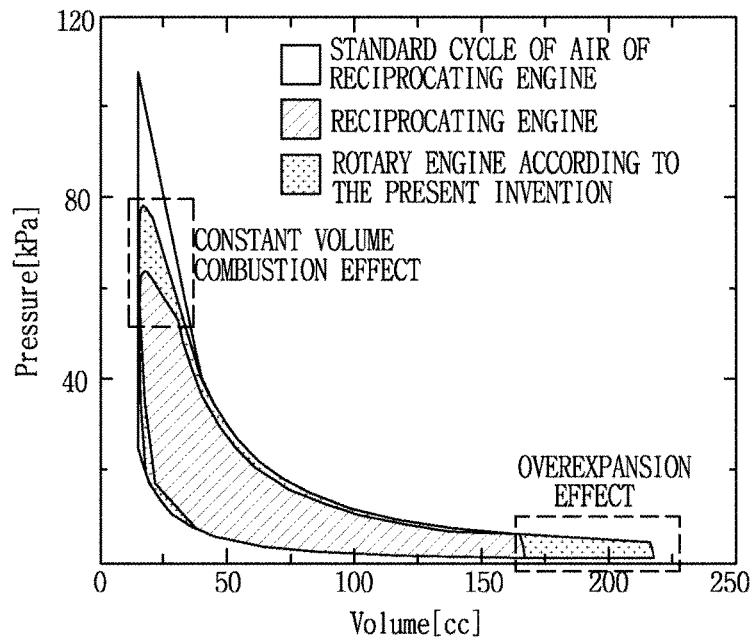
Figure 25:
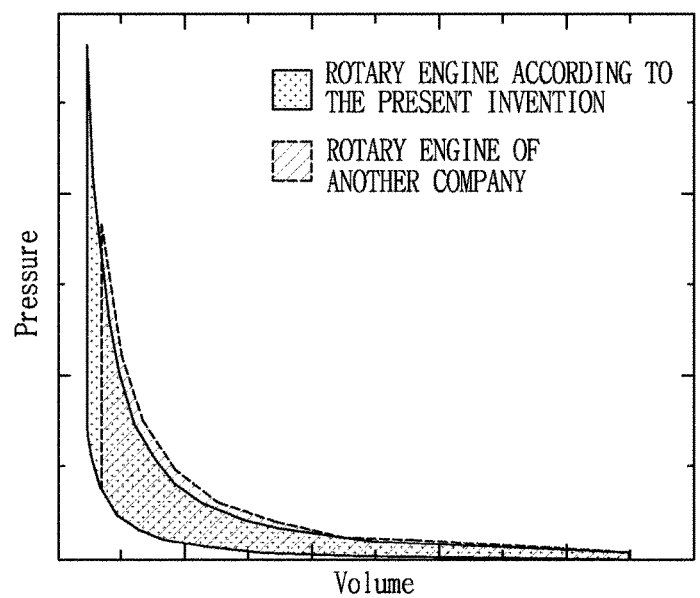

FIG. 13 is a conceptual view illustrating a shape of the lobe accommodating portion according to a value N;

FIG. 14 is a conceptual view for defining a maximum size of the rotor accommodating portion using E and $R_L$;

FIG. 15 is a conceptual view illustrating a variation of shapes of the rotor and the lobe accommodating portion according to a ratio of E and $R_L$ under a condition that the maximum size of the rotor accommodating portion is uniform;

FIG. 16 is a view illustrating a track drawn in response to a rotation of the rotor when the ratio of E and $R_L$ is 1:3 ($R_L/E=3$);

FIG. 17 is an enlarged view of a part A illustrated in FIG. 3;

FIG. 18 is a conceptual view illustrating a first embodiment of a controller and a flow of mixed gas in association with the control unit;

FIG. 19 is a conceptual view illustrating a second embodiment of a control unit and a flow of mixed gas in association with the control unit;

FIG. 20 is a conceptual view illustrating operations of a combustion controller during compression and combustion processes;

FIG. 21 is a conceptual view illustrating operations of a combustion controller during combustion and expansion processes;

FIG. 22 is a graph showing a variation of an area ratio in response to a change in a rotation angle of a rotor during a combustion period according to presence or absence of a combustion controller;

FIG. 23 is a graph showing a volume change of a combustion chamber in response to a change in a rotation angle of a rotor during a combustion period according to presence or absence of a combustion controller;

FIG. 24 is a graph showing a P-V diagram of the rotary engine of FIG. 1A and a reciprocating engine; and FIG. 25 is a graph showing a P-V diagram of the rotary engine of FIG. 1A and a rotary engine from another company.

DETAILED DESCRIPTION

Description will now be given in detail of a rotary engine according to exemplary embodiments disclosed herein, with reference to the accompanying drawings.

A singular representation may include a plural representation unless it represents a definitely different meaning from the context.

In describing the present invention, if a detailed explanation for a related known function or construction is considered to unnecessarily divert the gist of the present disclosure, such explanation has been omitted but would be understood by those skilled in the art.

The present invention has been explained with reference to the embodiments which are merely exemplary. It will be apparent to those skilled in the art that various modifications and variations can be made in the present invention without departing from the spirit or scope of the invention.

Figure 1B:
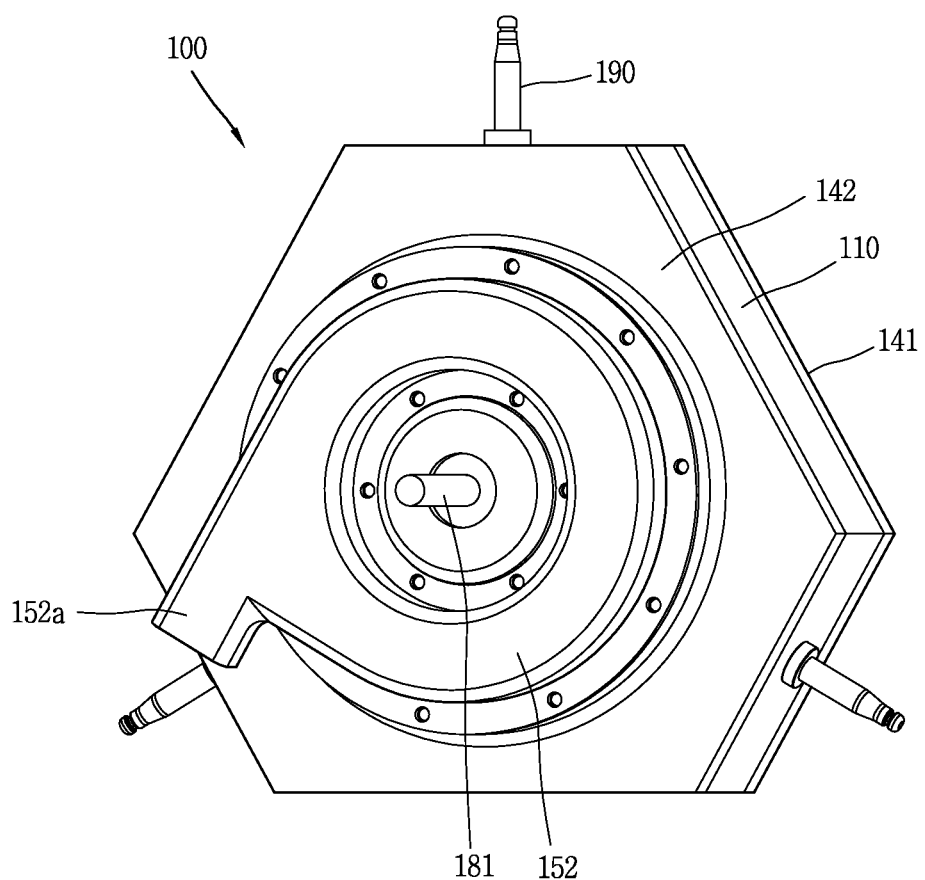
Figure 2:
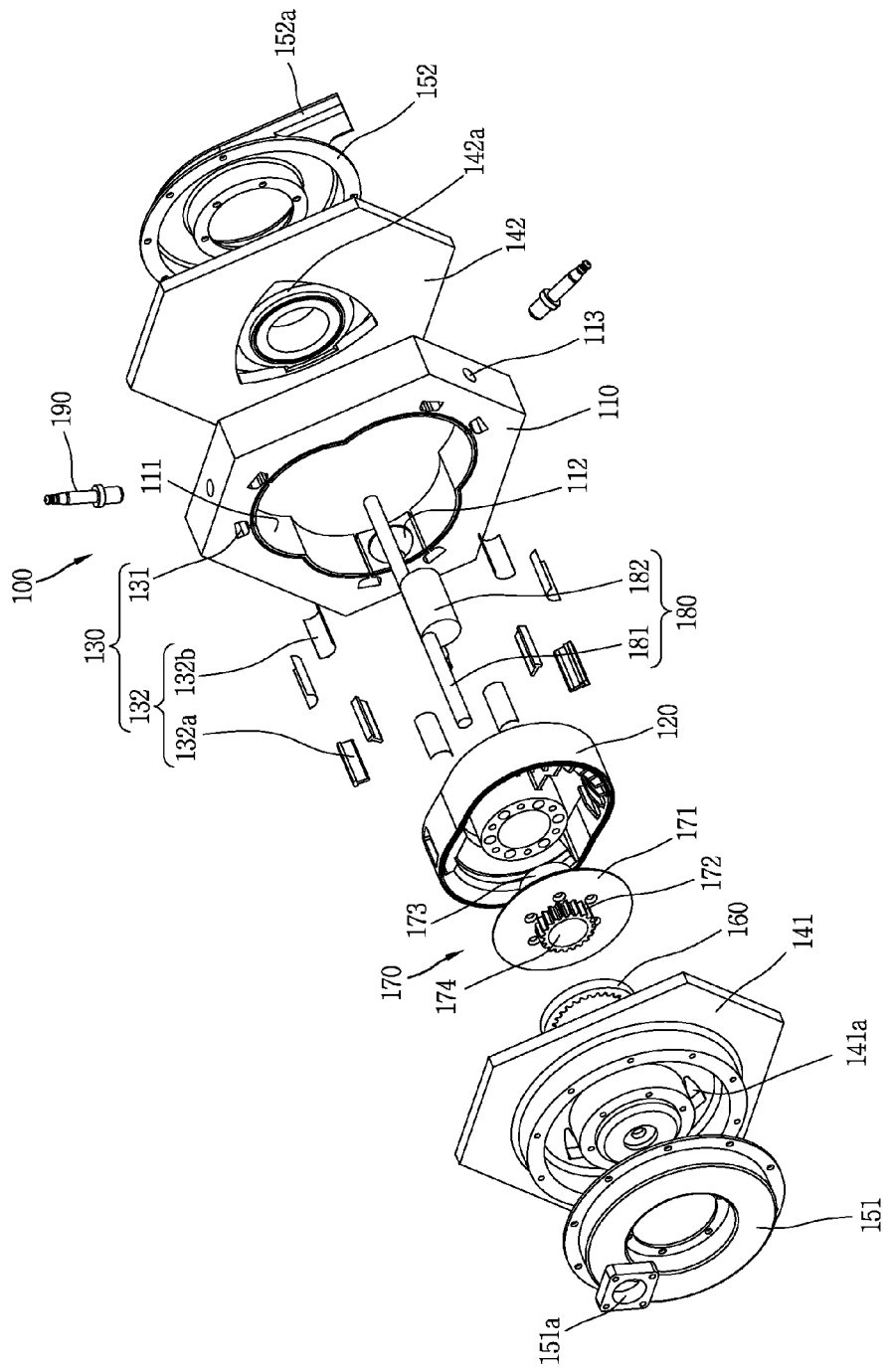
Figure 4A:
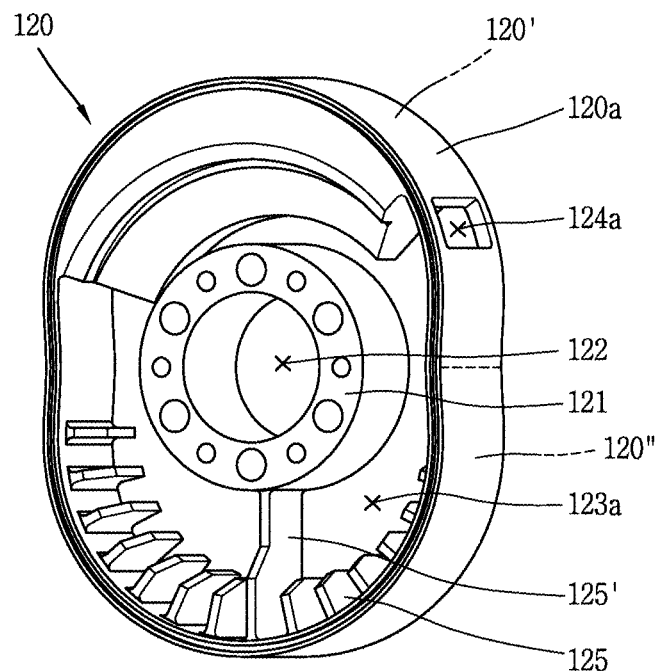
Figure 4B:
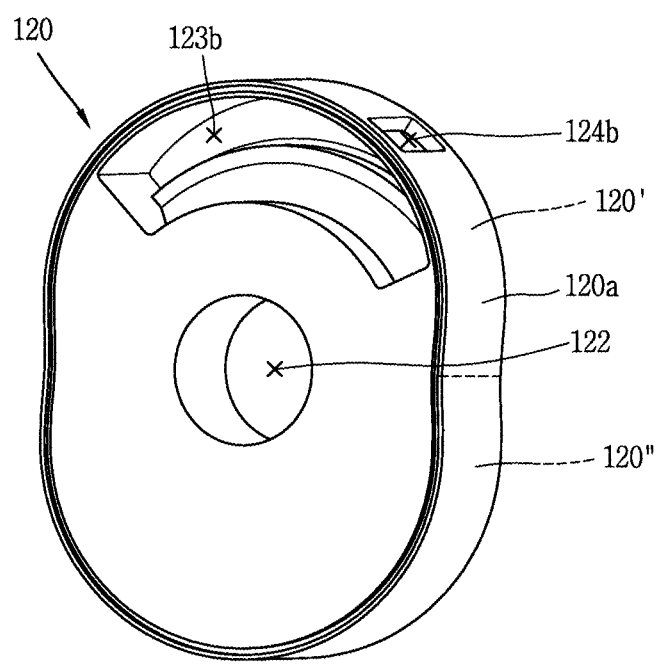

FIGS. 1A and 1B are perspective views illustrating a rotary engine 100 in accordance with one embodiment of the present invention, viewed from front and rear directions, FIG. 2 is an exploded perspective view of the rotary engine 100 illustrated in FIG. 1A, FIG. 3 is a conceptual view illustrating an internal structure of the rotary engine 100 illustrated in FIG. 1A, and FIGS. 4A and 4B are perspective views of a rotor 120 illustrated in FIG. 2, viewed from front and rear directions.

A rotary engine 100 according to one embodiment disclosed herein is configured in a manner that volumes of N operation chambers formed between a housing 110 and a rotor 120 change, in response to an eccentric rotation of the rotor 120 within the housing 110, and four strokes of intake→compression→explosion→exhaust are consecutively executed during the change. A crankshaft 180 rotates in response to the eccentric rotation of the rotor 120, and is connected to another component so as to transfer driving force generated.

As illustrated in FIG. 2, the rotary engine 100 disclosed herein includes a housing 110, spark plugs 190, a rotor 120, an intake manifold 151, an intake-side housing cover 141, a guide gear 160, a rotor gear 170, a crankshaft 180, an exhaust-side housing cover 142, an exhaust manifold 152 and combustion controllers 130.

First, the housing 110 is provided with N lobe accommodating portions 111 therein (here, N is a natural number equal to or greater than 3). This embodiment exemplarily illustrates an example that three lobe accommodating portions 111 (i.e., N=3) are provided. A design for a shape of each lobe accommodating portion 111 will be explained later.

On an upper central portion of each of the N lobe accommodating portions 111 is provided with a combustion chamber 112 that communicates with the lobe accommodating portion 111 (i.e., N combustion chambers 112 are provided). Referring to FIG. 3, the combustion chamber 112 has a shape recessed into an inner wall of the housing 110 that forms the lobe accommodating portion 111. A size of the combustion chamber 112 is differently designed according to a compression ratio of the rotary engine 100.

The spark plugs 190 are provided on the housing 110 to emit spark to the combustion chambers 112, respectively, so as to ignite mixed gas filled in the combustion chambers 112. As illustrated, each of the spark plugs 190 is inserted through an insertion hole 113 of the housing 110 in a manner of being exposed to an upper portion of the combustion chamber 112. The insertion hole 113 communicates with the combustion chamber 112.

Sealing components (not illustrated) are provided between the housing 110 and the intake-side housing cover 141 and the exhaust-side housing cover 142 to be explained later, respectively, to prevent external leakage of the mixed gas.

Meanwhile, the combustion controllers 130 are provided on both sides of each of the combustion chambers 112, respectively, to limit a combustion range of the mixed gas. Each of the combustion controllers 130 is automatically operated without any separately-applied driving force. Detailed description thereof will be provided later.

The rotor 120 is inserted into each of the lobe accommodating portions 111, and eccentrically rotates centering on a center of the lobe accommodating portion 111. The rotor 120 is provided with N−1 lobes 120' and 120" which are consecutively accommodated in each of the lobe accommodating portions 111. A design for an outer shape of the rotor 120 will be explained later.

Referring to FIGS. 4A and 4B, a supporting portion 121 on which the rotor gear 170 is mounted is provided in a central portion of the rotor 120. A through hole 122 is formed through the supporting portion 121. A crankshaft 180 inserted through the rotor gear 170 is inserted through the through hole 122. A front surface of the supporting portion 121 supports a flange portion 171 of the rotor gear 170, and coupling means such as coupling members are used to maintain a firmly-coupled state between the supporting portion 121 and the flange portion 171.

A first storage portion 123a is provided in a front portion of the rotor 120. The first storage portion 123a temporarily stores mixed gas introduced through the intake manifold 151 and the intake-side housing cover 141. The first storage portion 123a has a shape recessed from the front portion of the rotor 120 toward a rear portion of the rotor 120 (i.e., in a thickness direction of the rotor).

As the first storage portion 123a is formed, an edge of a portion of the rotor 120 (as illustrated, a part of the first storage portion 123a which does not share a side wall with a second storage portion 123b) is left thin, which may result in lowering rigidity of the rotor 120. Considering this, ribs 125 for reinforcing the rigidity of the rotor 120 may protrude from a plurality of points on an inner side surface of the rotor 120 forming the first storage portion 123a. In this instance, at least one rib 125' may be connected to the supporting portion 121, and have a portion with a height lower than a thickness of the rotor 120 such that the mixed gas temporarily stored in the first storage portion 123a flows to an opposite side.

An intake port 124a communicating with the first storage portion 123a is formed through a side portion of the rotor 120, such that the introduced mixed gas can be introduced into the lobe accommodating portions 111. The intake port 124a is located at a position allowing the introduction of the mixed gas while the rotor 120 rotates by 120° in a counterclockwise direction.

A second storage portion 123b in which exhaust gas generated after combustion is temporarily stored is provided in a rear portion of the rotor 120. The second storage portion 123b has a shape recessed from the rear portion of the rotor 120 toward a front portion of the rotor 120 (i.e., a thickness direction of the rotor). The exhaust gas temporarily stored in the second storage portion 123b is discharged to outside through the exhaust-side housing cover 142 and the exhaust manifold 152.

An exhaust port 124b communicating with the second storage portion 123b is formed through a side portion of the rotor 120 such that exhaust gas generated after combustion can be introduced into the second storage portion 123b. The exhaust port 124b is located at a position where the exhaust gas can be exhausted after a counterclockwise rotation of the rotor 120 by 270°, such that introduced gas can be exhausted after being more expanded to a larger amount. Such overexpansion may result in increasing efficiency of the rotary engine 100. This will be explained in detail later.

The intake-side housing cover 141 and the intake manifold 151 are provided on a front portion of the housing 110, and the exhaust-side housing cover 142 and the exhaust manifold 152 are provided on a rear portion of the housing 110.

First, the intake manifold 151 is configured to intake mixed gas of fuel gas and air through an air inlet 151a, and provided on the outermost side of the rotary engine 100. This exemplary embodiment illustrates that the intake manifold 151 is provided on the front portion of the rotary engine 100. The intake manifold 151 is mounted on the intake-side housing cover 141.

The intake-side housing cover 141 is coupled to the housing 110 to cover one side of each of the lobe accommodating portions 111. A sealing member (not illustrated) is provided between the intake-side housing cover 141 and the housing 110 and the rotor 120, for airtight sealing.

The intake-side housing cover 141 is coupled to the intake manifold 151 and serves as a path along which the mixed gas introduced through the intake manifold 151 is transferred toward the rotor 120. To this end, the intake-side housing cover 141 is provided with an intake hole 141a that communicates with the first storage portion 123a provided in the front portion of the rotor 120.

A guide gear 160 is coupled to an inner side of the intake-side housing cover 141 that faces the lobe accommodating portions 111. The guide gear 160 has a ring shape with saw teeth along an inner circumference thereof. The guide gear 160 is configured such that the rotor gear 170 is rotated with being internally engaged therewith. Accordingly, the eccentric rotation of the rotor 120 with respect to the center of the lobe accommodating portions 111 can be guided. The number of teeth of the guide gear 160 is designed by considering a rotation ratio between the rotor 120 and the crankshaft 180 transferring driving force.

The rotor 120 is provided with the rotor gear 170 mounted thereto. The rotor gear 170 is provided with saw teeth formed along an outer circumference thereof. The rotor gear 170 rotates with being internally engaged with the guide gear 160 fixed to the intake-side housing cover 141. The number of teeth of the rotor gear 170 is designed by considering the rotation ratio between the rotor 120 and the crankshaft 180.

An accommodating portion 174 in which an eccentric portion 182 of the crankshaft 180 is inserted is formed through a central portion of the rotor gear 170. The eccentric portion 182 is rotatable within the accommodating portion 174. With the configuration, the eccentric portion 182 inserted in the accommodating portion 174 rotates in response to the eccentric rotation of the rotor 120. Structurally, a shaft portion 181 of the crankshaft 180 rotates by an N−1 round in a clockwise direction when the rotor 120 eccentrically rotates by one round in a counterclockwise direction.

As illustrated, the rotor gear 170 may include a flange portion 171 formed in a shape of a flat plate to be supported and fixed by the supporting portion 121 of the rotor 120, a gear portion 172 formed on one surface of the flange portion 171 and brought into contact with the inside of the guide gear 160, a boss portion 173 protruding from another surface of the flange portion 171 to be inserted into the through hole 122 of the rotor 120 when the flange portion 171 is mounted on the supporting portion 121 of the rotor 120, and an accommodating portion 174 formed through the gear portion 172 and the boss portion 173 such that the eccentric portion 182 of the crankshaft 180 can be inserted therethrough.

The crankshaft 180 includes a shaft portion 181 penetrating through the rotary engine 100, and an eccentric portion 182 formed eccentric from the shaft portion 181 and inserted into the accommodating portion 174 of the rotor gear 170. In this embodiment, a front part of the shaft portion 181 penetrates through the intake-side housing cover 141 and the intake manifold 151, and a rear part of the shaft portion 181 penetrates through the exhaust-side housing cover 142 and the exhaust manifold 152.

The shaft portion 181 is connected to another system and configured to transfer driving force generated by the rotary engine 100 to the another system. The shaft portion 181 is eccentric from the center of the rotor 120 by a value (distance) E. Here, the maximum diameter of the shaft portion 181 is limited to 2E.

The exhaust-side housing cover 142 is coupled to the housing 110 to cover another side of each of the lobe accommodating portions 111. A sealing member (not illustrated) is provided between the exhaust-side housing cover 142 and the housing 110 and the rotor 120, for airtight sealing.

The exhaust-side housing cover 142 is coupled to the exhaust manifold 152 and serves as a path along with generated exhaust gas is transferred to the exhaust manifold 152. To this end, the exhaust-side housing cover 142 is provided with an exhaust hole 142a communicating with the second storage portion 123b located in the rear portion of the rotor 120.

The exhaust manifold 152 is coupled to the exhaust-side housing cover 142. The exhaust manifold 152 is configured to discharge exhaust gas through an air outlet 152a, and disposed at the outermost side of the rotary engine 100. This embodiment exemplarily illustrates that the exhaust manifold 152 is provided on the rear portion of the engine.

The rotary engine 100 with the structure operates through four strokes of intake-compression-explosion (expansion)-exhaust for one cycle. Hereinafter, a motion of the rotor 120 within the housing 110 for each stroke will be described.

FIGS. 5 to 8 are conceptual views illustrating the processes of intake→compression→explosion→exhaust of the rotary engine 100 illustrated in FIG. 3 on the basis of a rotation angle of the rotor 120. As aforementioned, the intake port 124a and the exhaust port 124b are provided on the side portion of the rotor 120, respectively.

Figure 5:
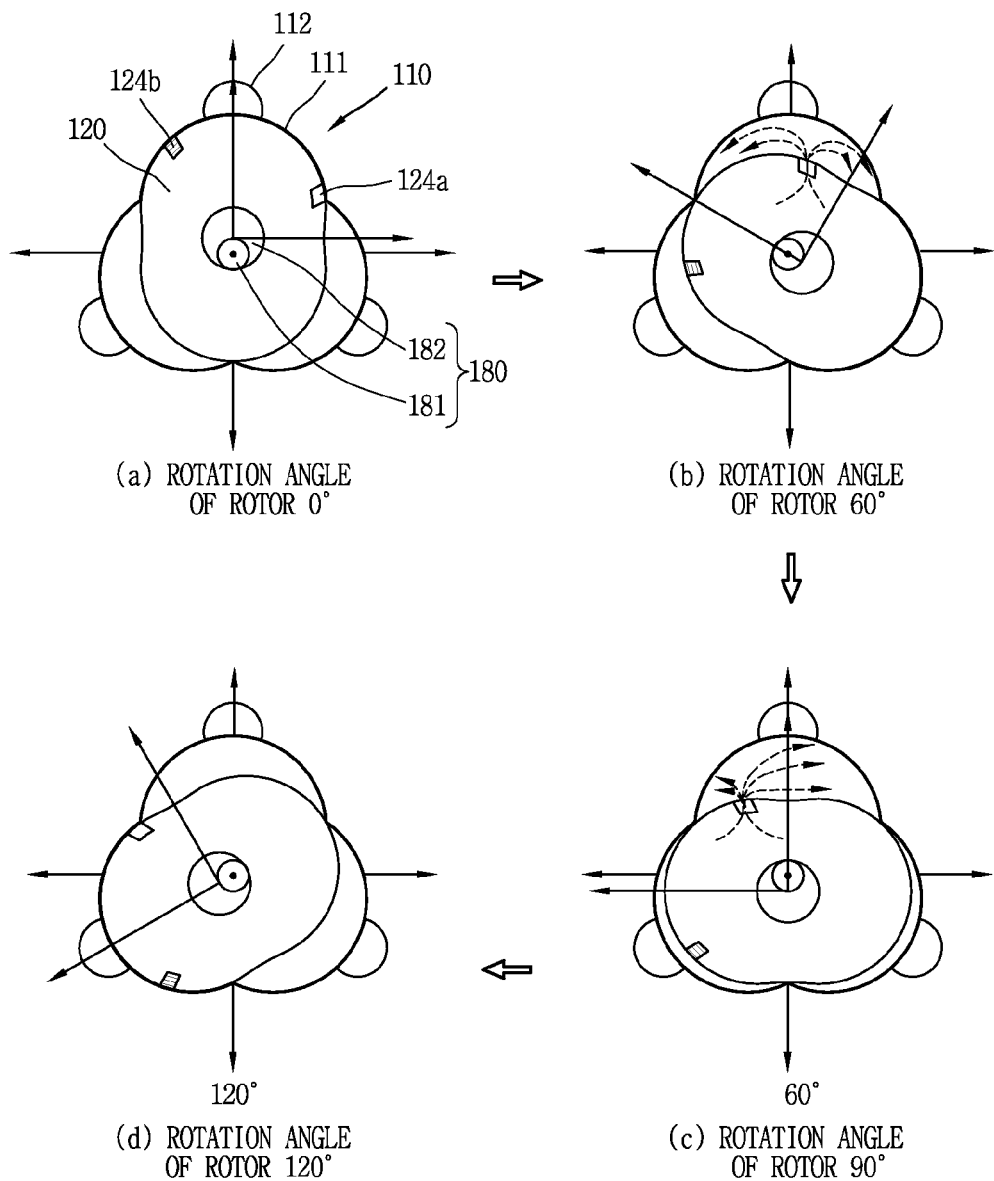

First, the intake process will be described with reference to FIG. 5. The intake process is enabled by the rotor 120 that rotates within the housing 110 in a counterclockwise direction, and continued while a rotation angle of the rotor 120 changes from 0° up to 120°. While the rotor 120 rotates from 0° to 120° in the counterclockwise direction based on the drawing, mixed gas is introduced into the lobe accommodating portion 111 provided at an upper portion of the housing 110 and the combustion chamber 112 communicating with the lobe accommodating portion 111.

In this instance, as illustrated, the mixed gas is introduced the most when the rotation angle of the rotor 120 is 90°, but the rotary engine 100 according to the present invention is designed to intake the mixed gas until when the rotation angle of the rotor 120 is 120°. This is for causing over-expansion during the expansion process so as to improve efficiency of the rotary engine 100.

Figure 6:
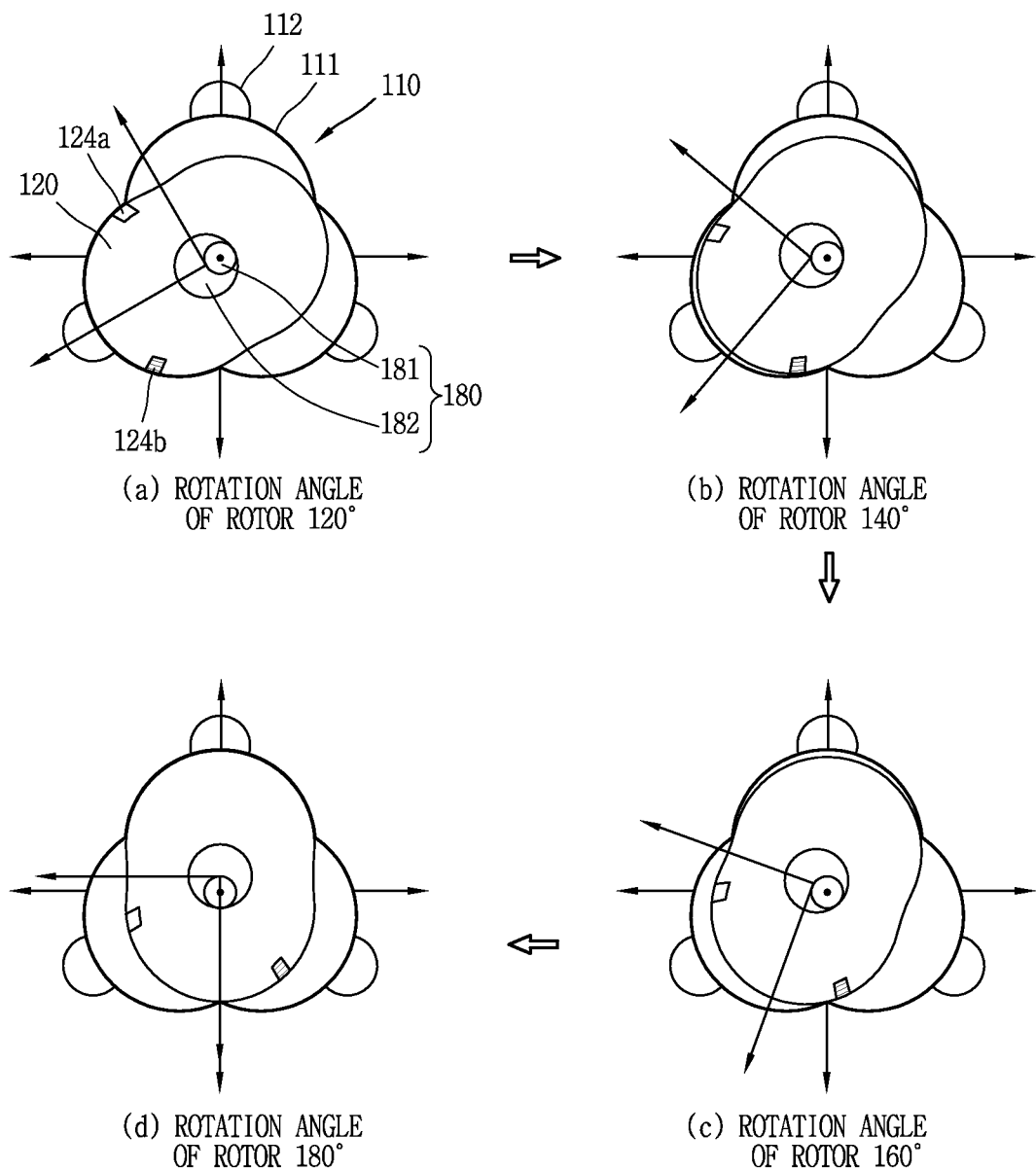

Next, referring to FIG. 6, after the intake process, the mixed gas starts to be compressed by the rotation of the rotor 120. The compression process is executed while the rotation angle of the rotor 120 changes from 120° to 180°. The maximum compression ratio reaches when the rotor 120 rotates by 180°. In this instance, the mixed gas is ideally in a state of being fully filled in the combustion chamber 112.

An ignition by the spark plug 190 is started at the end of the compression process, and the combustion process of the mixed gas is started accordingly. The combustion process is continued until the beginning of the explosion process. The combustion process is started from when the rotation angle of the rotor 120 is about 160° and completely ended when the rotation angle of the rotor 120 is about 200°.

Meanwhile, the intake process by which mixed gas is introduced into the lobe accommodating portion 111 provided at a left lower end of the housing 110 in the drawing and the combustion chamber 112 communicating with the corresponding lobe accommodating portion 111 through the intake port 124a is started. That is, the processes of intake-→compression→explosion→exhaust are consecutively executed in the lobe accommodating portion 111 which correspond to a rotating direction of the rotor 120 and the combustion chamber 112 communicating with the lobe accommodating portion 111.

Figure 7:
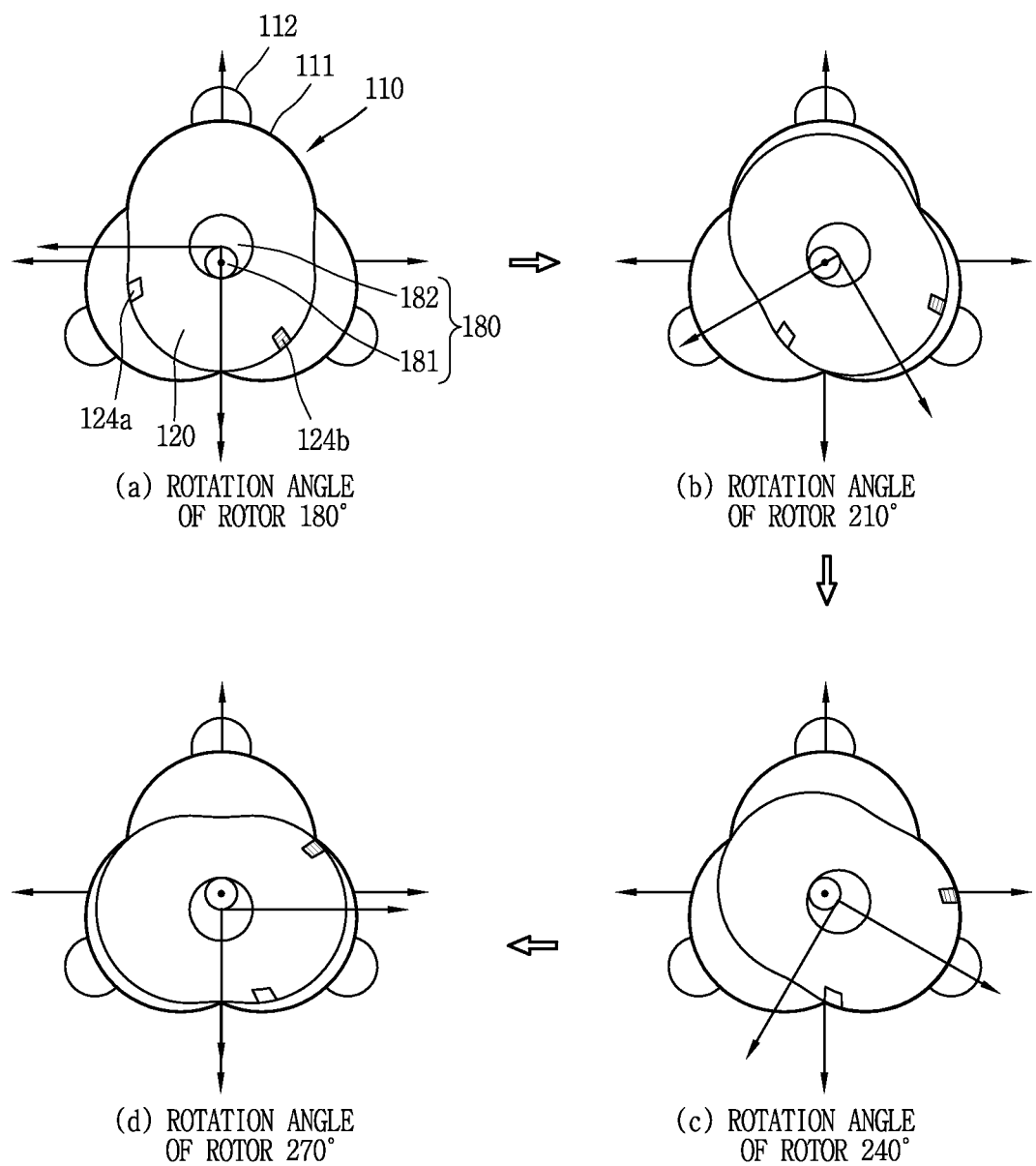

Next, referring to FIG. 7, the explosion (expansion) process is carried out while the rotation angle of the rotor 120 changes from 180° to 270°. The combustion process which has started at the end of the previous compression process is completely ended at the beginning of the explosion process.

During these processes, it should be noticed that the introduction of the mixed gas is executed as much as a volume corresponding to a state that the rotation angle of the rotor 120 is 120°, namely, a state that the rotor 120 rotates by 240° in this drawing, but the expansion process is carried out until the rotation angle of the rotor 120 is 270° at which a greater volume is formed.

Figure 8:
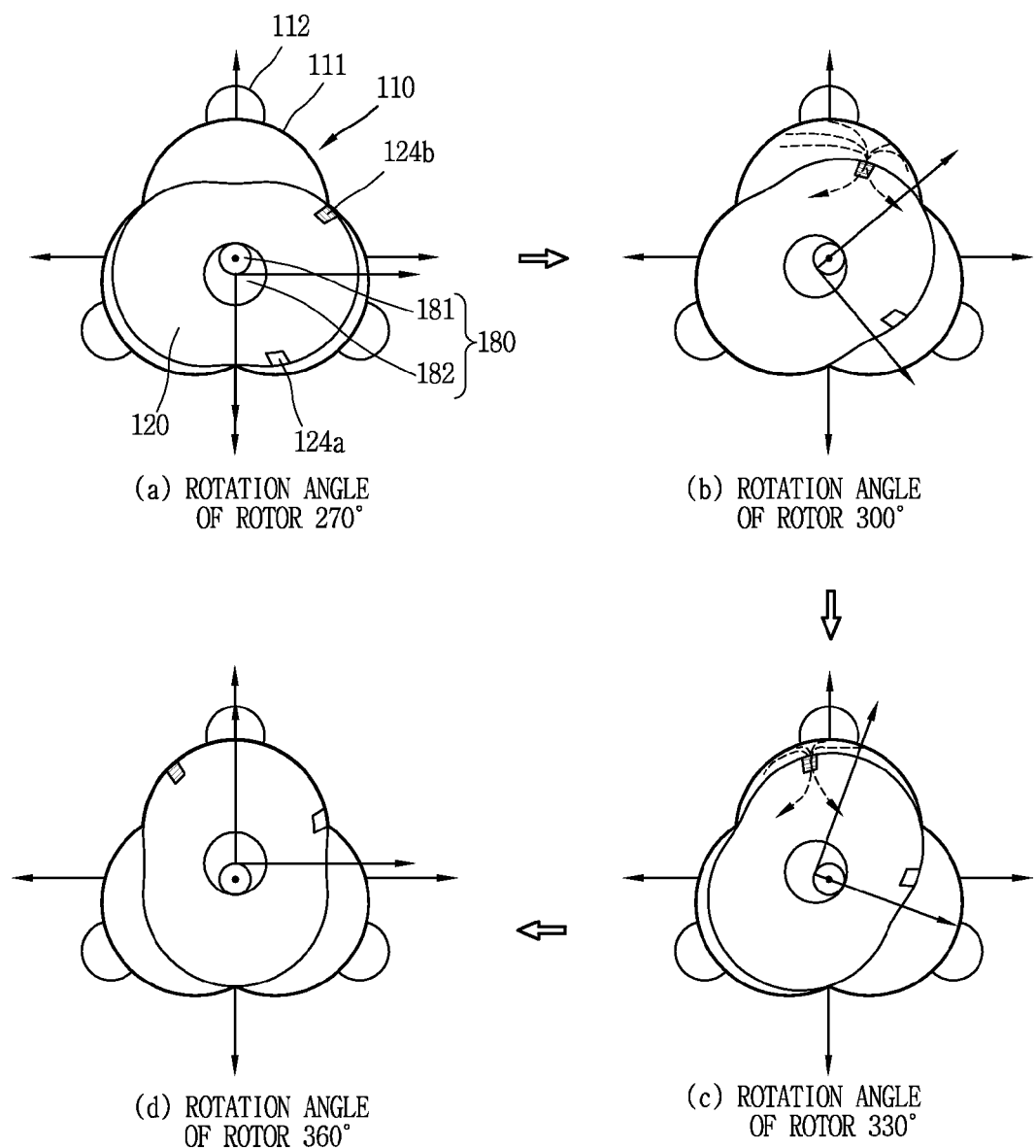

Next, referring to FIG. 8, the exhaust process is carried out while the rotation angle of the rotor 120 changes from 270° to 360°. Generated exhaust gas is discharged through the exhaust port 124b while the rotor 120 rotates from 270° to 360° in the counterclockwise direction.

Hereinafter, designs for an outer shape of the rotor 120 and a shape of the lobe accommodating portion 111, provided in the rotary engine 100 according to the present invention, will be described.

Figure 9:
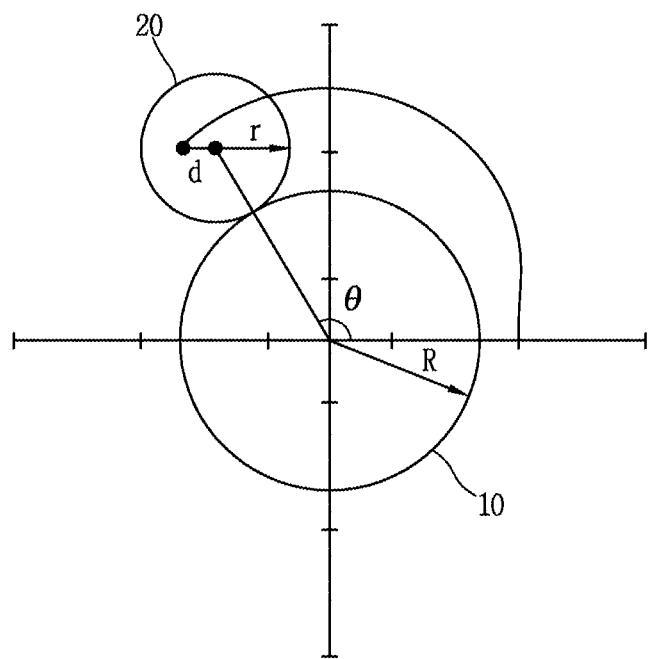

Prior to explaining the outer shape of the rotor 120 and the shape of the lobe accommodating portion 111, an epitroidal curve should first be understood. Referring to FIG. 9, a circle that moves in a manner of turning (rolling) on an arbitrary shape is referred to as a rolling circle 20, and a track that is drawn by an arbitrary point existing on the rolling circle 20 in response to the rolling circle 20 turning is referred to as trochoid. Here, the trochoid is generally classified by adding prefixes. A shape that the rolling circle 20 rolls along an outside of a base circle 10 is classified by adding a prefix 'Epi' and a shape that the rolling circle 20 rolls along an inside of the base circle 10 is classified by adding a prefix 'Hypo.' For reference, an outer shape of the rotor 120 of the rotary engine 100 or an inner shape of the housing 110 of the Wankel engine belongs to an epitrochoidal shape.

FIG. 9 illustrates an epitrochoidal track drawn by an arbitrary point on the rolling circle 20 while the rolling circle 20 rolls by an angle θ along an outside of the base circle 10, under assumption that a radius of the base circle 10 is R, a radius of the rolling circle 20 is r, and a distance between the arbitrary point on the rolling circle 20 and a center of the rolling circle 20 is d. This may be expressed by Equation 1, as follows.

$$x(\theta) = (R+r)\cos\theta - d\cos\left(\frac{R+r}{r}\theta\right)$$
$$y(\theta) = (R+r)\sin\theta - d\sin\left(\frac{R+r}{r}\theta\right)$$
[Equation 1]

In Equation 1 expressed above, x(θ) and y(θ) denote x coordinates and y coordinates of the arbitrary point on the rolling circle 20 when the rolling circle 20 rotates by the angle θ on the outside of the base circle 10. Here, Equation 1 corresponds to a case where the rolling circle 20 rotates in a counterclockwise direction centering on an x-axis of the base circle 10.

When the rolling circle 20 rotates along the outside of the base circle 10 by one round, the rolling circle 20 rotates by (R+r)/r (hereinafter, referred to N), which is a ratio of a distance R+r between the center of the rolling circle 20 and the center of the base circle 10 to the radius r of the rolling circle 20. Explaining Equation 1 in more detail, a first clause indicates a position of the center of the rolling circle 20 and a second clause indicates a position of an arbitrary point which is spaced apart from the center of the rolling circle 20 by the distance d. That is, the sum of the two clauses in Equation 1 indicates the position of the arbitrary point which exists on the rolling circle 20 based on the center of the base circle 10 as a reference point.

Hereinafter, the design for the outer shape of the rotor 120 will be described with reference to FIG. 10, based on the understanding of the epitrochoidal shape.

As aforementioned, the rotary engine 100 according to the present invention includes the housing 110 having the N lobe accommodating portions 111, and the rotor 120 having the N−1 lobes 120' and 120". Here, the shape of the rotor 120 has been designed based on the epitrochoidal shape, and the outer shape of the rotor 120 having the N−1 lobes 120' and 120" may be expressed by Equation 2 in a matrix form, on the basis of Equation 1. However, Equation 1 expresses the case where the rolling circle 20 rotates in the counterclockwise direction centering on the x-axis of the base circle 10, but Equation 2 expresses, for the sake of explanation, a case where the rolling circle 20 rotates in a clockwise direction centering on a y-axis of the base circle 10.

$$Ro(\alpha) = \begin{bmatrix} E\sin(N\alpha) + R_L\sin(\alpha) \\ E\cos(N\alpha) + R_L\cos(\alpha) \\ 1 \end{bmatrix} \quad \text{[Equation 2]}$$

In Equation 2, a first row indicates coordinates of an x-axis forming the outer shape of the rotor 120, a second row indicates coordinates of a y-axis, and a third row indicates a row that is arbitrarily set for applying an affine transformation required for designing an inner shape of the housing 110, which will be explained later. Comparing Equation 2 with Equation 1 which is the basic equation of the epitrochoidal shape, the rotation angle θ of the rolling circle 20 rotated centering on the base circle 10 is expressed by a in Equation 2, a distance d between the center of the rolling circle 20 and the arbitrary point is expressed by E in Equation 2, and the distance R+r between the center of the base circle 10 and the center of the rolling circle 20 is expressed by $R_L$ in Equation 2. Also, in Equation 2, N is the same as (R+r)/r expressed in Equation 1 and sometimes indicates the number of lobe accommodating portions 111 provided in the housing 110.

Figure 10:
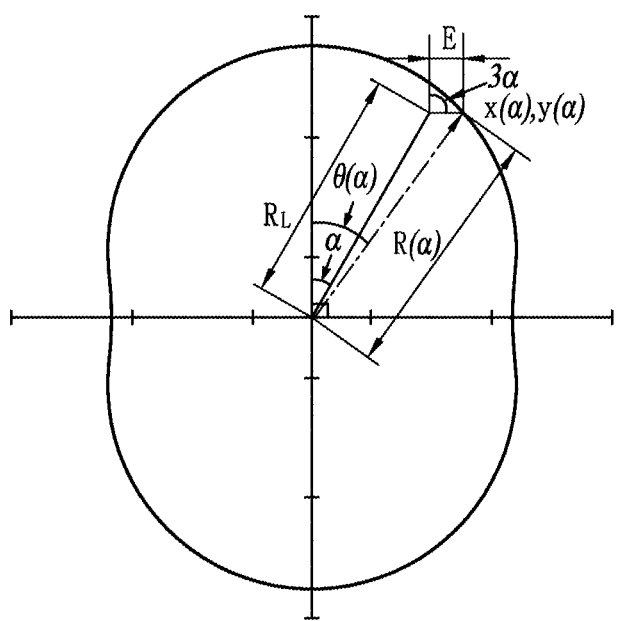

FIG. 10 illustrates the outer shape of the rotor 120 designed using Equation 2. For the sake of explanation, the outer shape of the rotor 120 is designed under assumption that the number N of the lobe accommodating portion 111 provided in the housing 110 is 3. As illustrated in FIG. 10, the outer shape of the rotor 120 may be expressed by movements of two bars having different rotation speeds and lengths from each other. That is, when a first bar having a length of $R_L$ rotates by a centering on the origin, a second bar having a length of E rotates more by N times (rotating more by 3α because N is 3) centering on an end point of the first bar having the length of $R_L$. In this instance, a track drawn by an end point of the second bar having the length of E is the shape of the rotor 120.

To more briefly express this, as illustrated in FIG. 10, if it is assumed that a distance between the end point of the second bar having the length of E and a center of rotation of the first bar having the length of $R_L$ is R(α) and a rotated angle of the R(α) centering on the y-axis is θ(α), Equation 2 may briefly be expressed as Equation 3, as follows.

$$Ro(\alpha) = \begin{bmatrix} R(\alpha)\sin(\theta(\alpha)) \\ R(\alpha)\cos(\theta(\alpha)) \\ 1 \end{bmatrix} \quad \text{[Equation 3]}$$

Here, representing θ(α) and R(α) using a trigonometrical function, they may be expressed by Equations 4 and 5.

$$\theta(\alpha) = \tan^{-1}\left(\frac{E\sin(N\alpha) + R_L\sin(\alpha)}{E\cos(N\alpha) + R_L\cos(\alpha)}\right) \quad \text{[Equation 4]}$$

$$R(\alpha) = \sqrt{(E\cos(3\alpha) + R_L\cos(\alpha))^2 + (E\sin(3\alpha) + R_L\sin(\alpha))^2} \quad \text{[Equation 5]}$$

Hereinafter, the design for the inner shape of the housing 110, namely, the shape of the lobe accommodating portion 111 will be described with reference to FIGS. 11 to 13.

To design the inner shape of the housing 110, it is first necessary to understand a movement of the rotor 120 that rotates centering on the center of the housing 110 (strictly speaking, a center of the shaft portion 181 of the crankshaft 180, equal to the center of the lobe accommodating portion 111). When the rotor 120 of the rotary engine 100 according to the present invention rotates by one round centering on the center of the housing 110 in a counterclockwise direction, the crankshaft 180 of the rotary engine 100 rotates by an N−1 round in a clockwise direction. That is, in case where the number of the lobe accommodating portion 111 provided in the housing 110 is 3, when the rotor 120 rotates by one round in the counterclockwise direction, the crankshaft 180 rotates by two rounds in the clockwise direction. In this instance, the rotor 120 rotates with being spaced apart from the center of the shaft portion 181 by the eccentric distance E.

As such, the inner shape of the housing 110 is decided by the shape of the rotor 120 that eccentrically rotates centering on the center of the shaft portion 181. To accurately design the inner shape of the housing 110, it is needed to recognize a rotated position of the rotor 120 centering on the crankshaft 180 when the rotor 120 rotates by an arbitrary angle β. However, the aforementioned Equation 1 or 2 is merely a location function of the rotor 120 that rotates centering on the center of the rotor 120. Therefore, in order to check the location of the rotor 120 rotating centering on a central axis of the shaft portion 181, which is eccentric from the center of the rotor 120, a shape function of the rotor 120, which is defined in Equation 1 or 2, should be redefined using the affine transformation. Equation 6 expresses an affine transformation matrix for this.

$$M(\beta) = \begin{bmatrix} \cos(-\beta) & \sin(-\beta) & E\sin((N-1)\beta) \\ -\sin(-\beta) & \cos(-\beta) & E\cos((N-1)\beta) \\ 0 & 0 & 1 \end{bmatrix} \quad \text{[Equation 6]}$$

Here, first and second columns indicate a rotation of a coordinate axis of the rotor 120, and a third column indicates a movement of the coordinate axis of the rotor 120. As illustrated in FIG. 10, the first and second column items are applied because the coordinate axis of the rotor 120 rotates by $-\beta$ centering on a coordinate axis which is set based on the center of the shaft portion 181, and the third column item is applied because the coordinate shaft of the rotor 120 moves by E based on the coordinate axis which is set based on the center of the shaft portion 181 and in this instance, the center of the rotor 120 rotates by $(N-1)\beta$ centering on the center of the shaft portion 181. Therefore, the movement of the rotor 120 for designing the inner shape of the housing 110 may be expressed by Equations 7 and 8 based on Equation 3 expressing the shape of the rotor 120 and Equation 6 expressing an eccentrically-rotated position centering on the coordinate shaft which is set based on the center of the shaft portion 181.

$$Rh(\beta) = M(\beta) \times Ro(\alpha) \quad \text{[Equation 7]}$$

$$Rh(\beta) = \begin{bmatrix} R(\alpha)\sin(-\beta + \theta(\alpha)) + E\sin((N-1)\beta) \\ R(\alpha)\cos(-\beta + \theta(\alpha)) + E\cos((N-1)\beta) \\ 1 \end{bmatrix} \quad \text{[Equation 8]}$$

Figure 11:
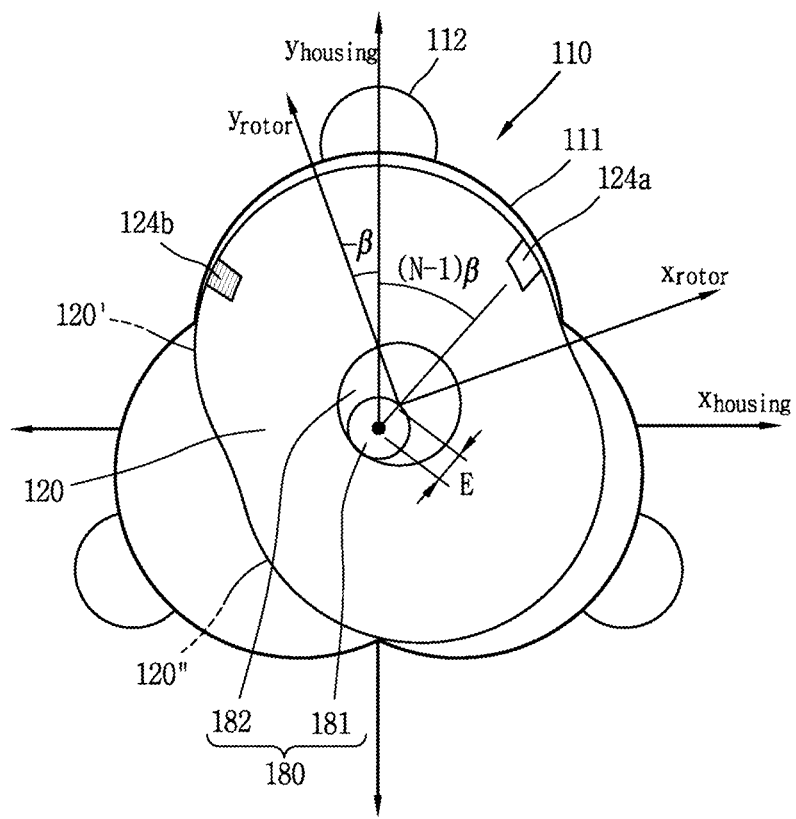
Figure 12:
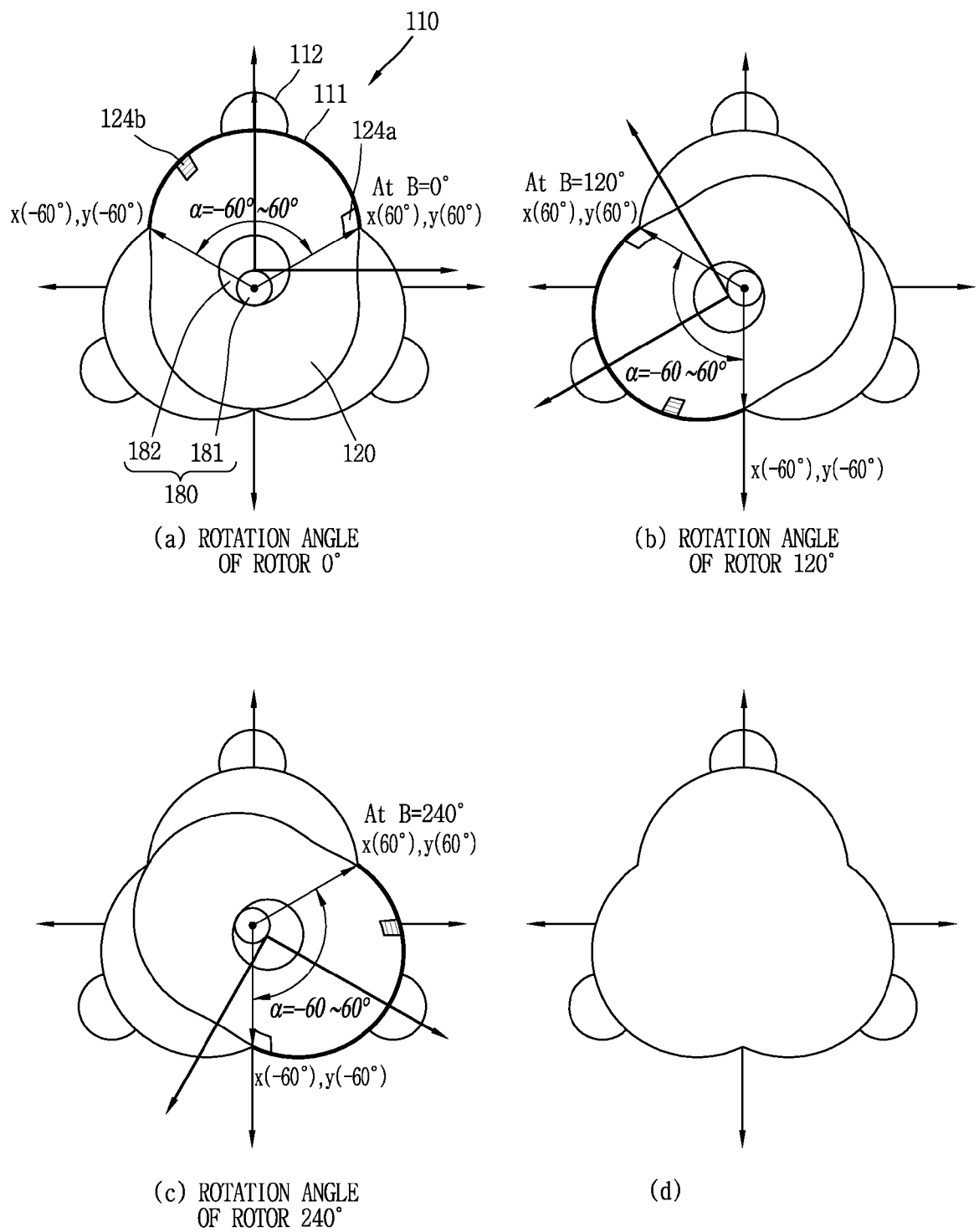

FIG. 11 is a view defining an inner surface of the housing 110 having the three lobe accommodating portions 111 using Equation 8. As illustrated in FIG. 11, the shape of the housing 110 having the three lobe accommodating portions 111 may be represented in a manner of adding partial shapes of the rotor 120 when the rotor 120 rotates by 0°, 120° and 240° (rotates by 0°, 90°, 180° and 270° if the number of the lobe accommodating portion 111 is 4). Also, the partial shapes of the rotor 120 deciding the inner shape of the housing 110 correspond to shapes when a shape angle α of the rotor 120 is in the range of −60° to 60°.

Generalizing this, the inner shape of the housing 110 having the N lobe accommodating portions 111 may be expressed in a manner of adding the outer shapes of the rotor 120 with the shape angle α ranging from −360/2N to 360/2N, of the rotated shapes of the rotor 120, when the rotor 120 rotates by (360/N)i (here, i=0, 1, . . . , N−1). Table 1 shows the rotation angle of the rotor 120 deciding the inner shape of the housing 110 and the range of the shape angle α according to a value N, and FIG. 13 is a conceptual view illustrating each shape of the lobe accommodating portion 111 according to the value N.

Hereinafter, an optimal design for the rotary engine 100 associated with the outer shape of the rotor 120 and the shape of the lobe accommodating portion 111 will be described.

FIG. 14 illustrates size and shape of the lobe accommodating portion 111 using variables E and $R_L$ defining the previously-defined outer shape of the rotor 120. As illustrated in FIG. 14, a maximum size of the lobe accommodating portion 111 may be defined in a manner of adding a distance $E+R_L$ between the center of the rotor 120 and an outer surface 120a of the rotor 120 spaced the farthest away from the center of the rotor 120 and a distance E between the center of the rotor 120 and the center of the lobe accommodating portion 111. Therefore, it can be noticed that the lobe accommodating portion 111 with the maximum size is located on the same line as a circumference of a circle with a radius of $2E+R_L$.

FIG. 15 is a conceptual view illustrating a variation of shapes of the rotor 120 and the lobe accommodating portion 111 according to a change in a ratio of E to $R_L$ in a state that the maximum size of the lobe accommodating portion 111 is fixed to $2E+R_L$.

As illustrated in FIG. 15, it can be understood that an overall shape of the lobe accommodating portion 111 becomes similar to a circle with the radius $2E+R_L$ illustrated in FIG. 14 and the shape of the rotor 120 gradually varies similar to a circle as the ratio $(R_L/E)$ of $E:R_L$ increases.

The shape variation results in more increasing an area (a shaded portion) of each operation chamber forming a stroke volume of the rotary engine 100 when the ratio $(R_L/E)$ of $E:R_L$ is smaller. Eventually, for designing the rotary engine 100 having a constant stroke volume, the rotary engine can be thinner in thickness when the ratio $(R_L/E)$ of $E:R_L$ is smaller.

However, for designing the rotary engine 100 according to the present invention using the shape design equations of the rotor 120 and the lobe accommodating portion 111 defined by Equations 3 and 8, if the ratio of $E:R_L$ is less than 1:5 (less than $R_L/E=5$), a track drawn in response to the rotation of the rotor 120 goes beyond the shape of the lobe accommodating portion 111 within the housing 110.

FIG. 16 illustrates the lobe accommodating portion 111 (indicated with a bold line) which is designed when the ratio of $E:R_L$ is 1:3 ($R_L/E=3$) and tracks drawn in response to the rotation of the rotor 120 (indicated with a thin line). It can be understood that the track drawn in response to the rotation of the rotor 120 goes beyond the inner shape of the lobe accommodating portion 111, namely, the housing 110. Therefore, when the rotary engine 100 according to the present invention is designed by the design equations (Equations 3 and 8) of the rotor 120 and the lobe accommodating portion 111, the ratio of $E:R_L$ should be at least 1:6 ($R_L/E=6$ or more).

TABLE 1

|  | Number of rob accommodating portions (N) | | | |
| --- | --- | --- | --- | --- |
|  | 3 | 4 | 5 | 6 |
| Rotation angle of rotor (β) | 0°, 120°, 240° | 0°, 90°, 180°, 270° | 0°, 72°, 144°, 216°, 288° | 0°, 60°, 120°, 180°, 240°, 300° |
| Range of shape angle (α) | −60 ≤ α ≤ 60 | −45 ≤ α ≤ 45 | −36 ≤ α ≤ 36 | −30 ≤ α ≤ 30 |

TABLE 2

| $E:R_L$ Ratio | 1:6 | 1:7 | 1:8 | 1:9 |
| --- | --- | --- | --- | --- |
| Size increase ratio (%) of rob accommodating portion ($E:R_L$ = 1:6 Basis) | — | 4% | 8% | 12% |

Table 2 compares the size of the lobe accommodating portion 111 according to the change in the ratio $(R_L/E)$ of $E:R_L$ when designing the engine with the same stroke volume and thickness. The size comparison of the lobe accommodating portion 111 has used $2E+R_L$ which is a radius of a circle having the same circumference as the maximum size of the lobe accommodating portion 111. Also, Table 2 shows the increase ratio of $2E+R_L$ according to the change in the ratio of $E:R_L$ based on 1:6 as the minimum ratio of $E:R_L$ which can be designed by the design equations of the rotor 120 and the lobe accommodating portion 111 applied to the present invention.

As can be seen in Table 2, upon designing the housing 110 having the same stroke volume and thickness, $2E+R_L$ increases, in response to the increase in the ratio $(E:R_L)$ of $E:R_L$ as the basic variables for designing the rotor and the lobe accommodating portion 111. That is, since the overall size of the lobe accommodating portion 111 increases in response to the increase in the ratio $(R_L/E)$ of $E:R_L$, the size of the housing 110 also increases. Therefore, upon designing the housing 110 having the same stroke volume and thickness, the overall size of the rotary engine 100 can be reduced by decreasing the ratio $(R_L/E)$ of $E:R_L$. This may result in an advantage upon designing the housing 110.

TABLE 3

| $E:R_L$ | 1:6 | 1:7 | 1:8 | 1:9 |
|---|---|---|---|---|
| Increase ratio (%) at surface area of rob accommodating portion ($E:R_L$ = 1:6 Basis) | — | 1% | 3% | 4% |

Table 3 compares the surface area of the lobe accommodating portion 111 according to the change in the ratio $(R_L/E)$ of $E:R_L$ upon designing the housing 110 having the same stroke volume and thickness.

The surface area of the lobe accommodating portion 111 forming the stroke volume of the rotary engine 100 is closely associated with a generation of unburned gas. The generation of the unburned gas generally results from that part of mixed gas is discharged without being burned during a process that flames are spread along with mixed gas (fuel and air) during the combustion process of the rotary engine 100 and then extinguished on an inner wall surface of the housing 110. It is generally known that the unburned gas is discharged more from the rotary engine 100 than from a reciprocating engine. This results from that the surface area of the lobe accommodating portion 111 corresponding to the stroke volume of the rotary engine 100 is wider than that of the reciprocating engine.

Referring to Table 3, it can be seen that the surface area of the lobe accommodating portion 111 increases as the ratio $(R_L/E)$ of $E:R_L$ increases in the engine having the same stroke volume and thickness. Therefore, an amount of unburned gas to be discharged can be reduced in a manner of decreasing the ratio $(R_L/E)$ of $E:R_L$ such that the surface area of the lobe accommodating portion 111 defining the stroke volume of the rotary engine 100 is reduced.

TABLE 4

| $E:R_L$ Ratio | 1:6 | 1:7 | 1:8 | 1:9 |
|---|---|---|---|---|
| Decrease ratio(%) of eccentric distance (E) ($E:R_L$ = 1:6 Basis) | — | 11% | 20% | 27% |

Table 4 shows the change in an eccentric distance between the center of the lobe accommodating portion 111 and the center of the rotor 120 according to the change in the ratio $(R_L/E)$ of $E:R_L$ upon designing the engine with the same stroke volume and the thickness. The eccentric distance should be importantly considered upon designing the rotary engine 100 because a diameter of the shaft portion 181 of the crankshaft 180 transferring driving force of the engine changes according to the eccentric distance (a designable maximum distance of the shaft portion 181 corresponds to two times (2E) of the eccentric distance (see FIG. 14)). That is, since a torque capable of being transferred to the shaft portion 181 more increases by more extending the diameter of the shaft portion 181 upon designing the rotary engine 100, the eccentric distance should more increase in order to extend the diameter of the shaft portion 181. Referring to Table 4, it can be checked that the eccentric distance decreases as the ratio $(R_L/E)$ of $E:R_L$ increases upon designing the rotary engine 100 having the same stroke volume and thickness. Therefore, in order to increase the diameter of the shaft portion 181 for transferring the driving force of the rotary engine 100, it can be more advantageous to lower the ratio $(R_L/E)$ of $E:R_L$.

The foregoing description has been given of the designable area, size, the surface area and eccentric distance according to the ratio $(R_L/E)$ of $E:R_L$ for the optimal design of the rotary engine 100, and the following results are obtained.

1. The maximum size of the lobe accommodating portion 111 can be reduced as the ratio $(R_L/E)$ of $E:R_L$ decreases, thereby allowing for a size reduction of the housing 110.

2. The surface area of the lobe accommodating portion 111 associated with the stroke volume of the rotary engine 100 can be reduced as the ratio $(R_L/E)$ of $E:R_L$ decreases, thereby reducing a generated amount of unburned gas.

3. The eccentric distance of the rotor 120 can increase as the ratio $(R_L/E)$ of $E:R_L$ decreases, thereby designing the shaft portion 181 of the crankshaft 180 transferring the torque of the rotary engine 100 to have a large size.

Consequently, upon designing the rotary engine 100 according to the present invention, it may be advantageous to decrease the ratio of E and $R_L$ as the important variables deciding the shapes of the rotor 120 and the lobe accommodating portion 111, and preferable to set the ratio to be more than 1:6 which is the minimum ratio for designing the engine. Also, considering those results, the state that the ratio of $E:R_L$ is 1:6 ($R_L/E$=6) may correspond to the optimal design condition.

Meanwhile, the rotary engine 100 according to the present invention includes combustion controllers 130 each of which solves a problem of an excessive emission of unburned gas occurred in an existing rotary engine 100 and enhancing efficiency of the rotary engine 100. Hereinafter, functions and detailed configuration of the combustion controller 130 will be described.

FIG. 17 is an enlarged view of a part A illustrated in FIG. 3.

As illustrated in FIG. 17, the combustion controllers 130 are provided in each lobe accommodating portion 111 provided in the housing 110. The combustion controllers 130 provided in each lobe accommodating portion 111 are disposed on both sides of each combustion chamber 112 to limit a combustion range of mixed gas. As previously illustrated in FIG. 3, in the rotary engine 100 in which N is 3 (N=3), two combustion controllers 130 are provided for each of the lobe accommodating portions 111, namely, totally six combustion controllers 130 are provided.

Each combustion controller 130 minimizes the amount of unburned gas to be generated in a manner of minimizing the surface area of the lobe accommodating portion 111 that is brought into contact with the mixed gas during the combustion process of the rotary engine 100, and enhances the efficiency of the rotary engine 100 by exhibiting a behavior similar to constant volume combustion in a manner of minimizing the change in the stroke volume of the rotary engine 100. Here, the constant volume combustion refers to the combustion process of the rotary engine 100 executed without a change in the stroke volume. If the stroke volume of the rotary engine 100 does not change during the combustion process, it may result in more increasing temperature of the combustion chamber 112, as compared with a general engine with a changeable stroke volume during the combustion, thereby ensuring high efficiency.

To this end, the combustion controllers 130 are preferably disposed at positions close to the combustion chamber 112 in order to minimize the surface area within the housing 110 brought into contact with the mixed gas and minimize the change in the stroke volume during the combustion.

As illustrated, each of the combustion controllers 130 includes a mounting portion 131 and a control unit 132.

The mounting portions 131 are provided at both sides of each combustion chamber 112 and communicate with the lobe accommodating unit 111 within the housing 110. Each of the mounting portions 131 may be understood as a type of groove recessed into an inner side wall of the housing 110 forming the lobe accommodating portion 111.

Each control unit 132 is disposed in each mounting portion 131. The control unit 132 protrudes into the lobe accommodating portion 111 and is inserted into the mounting portion 131. The control unit 132 is configured such that a part thereof normally protrudes into the lobe accommodating portion 111 and is inserted into the mounting portion 131 by being pressed due to a contact with the eccentrically-rotating rotor 120. Here, a degree that the control unit 132 is inserted into the mounting portion 131 varies according to a contact degree with the rotor 120.

Each component will be described in more detail. First, each mounting portion 131 includes an accommodation groove 131a and a communicating hole 131b.

The accommodation groove 131a defines a space for accommodating the control unit 132. In the accommodation groove 131a are disposed an elastic supporting member 132b of the control unit 132 and a moving member 132a elastically supported by the elastic supporting member 132b, which will be explained later. When the rotor 120 is fully accommodated within the lobe accommodating portion 111 (e.g., a 180°-rotated state of the rotor 120), the moving member 132a is fully inserted into the accommodating groove 131a.

The communicating hole 131b allows the accommodating groove 131a and the lobe accommodating portion 111 to communicate with each other such that the control unit 132 partially protrudes into the lobe accommodating portion 111, and has a smaller cross section than the accommodating groove 131a.

Each control unit 132 includes the moving member 132a and the elastic supporting member 132b.

The moving member 132a is disposed in the accommodating groove 131a and has a part that protrudes into the lobe accommodating portion 111 and is inserted into the accommodating groove 131a through the communicating hole 131b. The moving member 132a is also brought into contact with the outer surface 120a of the rotor 120 during the compression and expansion so as to maintain an airtight state. For this, the moving member 132a extends in a thickness direction of the rotor 120.

The elastic supporting member 132b is supported by the accommodating groove 131a so as to elastically press the moving member 132a toward the lobe accommodating portion 111. The elastic supporting member 132b may be configured as a plate spring, a leaf spring, a coil spring, a compression rubber and the like. As such, when the elastic supporting member 132b is configured as the plate spring, this configuration may have an advantage from the perspective of reliability of transferring constant pressing force to the moving member 132a even though compression force is repetitively applied.

The moving member 132a will now be described in more detail. Each moving member 132a includes a base portion 132a1 and a protruding portion 132a2. The drawing illustrates the moving member 132a in a shape like an alphabet "T" with the aforementioned detailed configuration.

The base portion 132a1 is formed in a plate-like shape, and elastically supported by the elastic supporting member 132b. The base portion 132a1 may have a cross section corresponding to that of the accommodating groove 131a. The elastic supporting member 132b is interposed between the base portion 132a1 and an inner side surface of the accommodating groove 131a to elastically support the moving member 132a. When the elastic supporting member 132b is configured as the plate spring, the plate spring may be formed in a shape like an alphabet "U" which is convex toward the base portion 132a1.

The base portion 132a1 is moved toward the communicating hole 131b when being pressed by the elastic supporting member 132b. The base portion 132a1 has the greater cross section than the communicating hole 131b, the base portion 132a1 is locked on the inner side wall of the accommodating groove 131a during the movement.

The protruding portion 132a2 protrudes from the base portion 132a1. The protruding portion 132a2 is configured to protrude into the lobe accommodating portion 111 and is inserted into the accommodating groove 131a through the communicating hole 131b. Without a contact between the protruding portion 132a2 and the rotor 120, the base portion 132a1 is locked on the inner side wall of the accommodating groove 131a and the protruding portion 132a2 protrudes the most into the lobe accommodating portion 111.

An end part of the protruding portion 132a2 is brought into contact with the rotor 120 during the compression and the expansion and accordingly a protruding degree and an inserted degree of the protruding portion 132a2 through the communicating hole 131b are adjusted, thereby maintaining the airtight state. The rotor 120 is configured to eccentrically rotate during the operation of the rotary engine 100. Therefore, the end portion of the protruding portion 132a2 brought into contact with the rotor 120 is affected by laterally-applied force depending on situations. When the lateral force is applied, the protruding portion 132a2 is configured such that the end part is inserted in a contact state with the rotor 120 while allowing the rotation of the rotor 120. To this end, the end part of the protruding portion 132a2 may be formed in a rounded shape or in a shape with both sides inclined.

FIGS. 18 and 19 are conceptual views illustrating first and second embodiments of control units 132 and 232 applied to the rotary engine 100 according to the present invention, and a flow of mixed gas related to those embodiments.

As illustrated in FIGS. 18 and 19, the present invention invents two types of control units 132 and 232, and classifies the two types into a basic control unit 132 and a check valve type control unit 232, taking into account of a moving method of unburned mixed gas. Each of the two types of control units 132 and 232 has the same basic configuration in view of including a moving member 132a, 232a formed in a shape like an alphabet "T" that is contactable with the rotor 120 in a protruding/inserted manner, and an elastic supporting member 132b, 232b elastically supporting the moving member 132a, 232a for allowing the protrusion and insertion of the moving member 132a, 232a. However, the two types of control units 132 and 232 employ different methods of moving mixed gas existing at an opposite side (II) of the combustion chamber 112 based on the moving member 132a, 232a toward a side (I) of the combustion chamber 112, starting from a time point that the moving member 132a, 232a is brought into contact with the rotor 120.

First, referring to FIG. 18 together with FIG. 2, when the intake-side housing cover 141 and the exhaust-side housing cover 142 are coupled to the housing 110, fine gaps are generated between the intake-side housing cover 141 and the moving member 132a and between the exhaust-side housing cover 142 and the moving member 132a. To this end, the moving member 132a may be formed with a length that is obtained by subtracting a predetermined length for forming the fine gaps at both sides thereof from a distance between the intake-side housing cover 141 and the exhaust-side housing cover 142.

In the basic control unit 132, the mixed gas is in a high pressure state at the opposite side (II) of the combustion chamber 112 divided based on the moving member 132a. Due to the fine gaps and a pressure difference of the mixed gas, the high pressure mixed gas at the opposite side (II) of the combustion chamber 112 flows toward the side (I) of the combustion chamber 112 through the fine gaps (flow of unburned mixed gas in a direction of II→I).

On the other hand, it is disadvantageous that the unburned gas generated at the side (I) of the combustion chamber 112 is partially likely to flow toward the opposite side (II) of the combustion chamber 112 through the fine gaps during the expansion process. However, it is predicted that such unburned gas corresponds to a very small quantity of gas and even extremely less than unburned gas generated in the existing rotary engine 100. The basic control unit 132 has such simple structure and thus obtains an advantage upon being actually applied.

Next, referring to FIG. 19, the moving member 232a of the check valve type control unit 232 is longer than the moving member 132a of the basic control unit 132, so as to restrict a considerable quantity of unburned mixed gas and unburned gas from flowing through the fine gaps. Instead of this, the moving member 232a of the check valve type control unit 232 is configured to move the unburned gas in one direction by virtue of its own structure. For this, the "T" shaped moving member 232a includes an air hole 232a2' and a cover 232a2".

The air hole 232a2' is formed through the protruding portion 232a2 of the moving member 232a, and communicates the opposite side (II) of the combustion chamber 112 with a space of the side (I) of the combustion chamber 112.

The cover 232a2" is provided on the protruding portion 232a2 to cover the air hole 232a2', and selectively opens and closes the air hole 232a2' according to a pressure difference. The cover 232a2" may be installed on the protruding portion 232a2 in a rotatable manner. The cover 232a2" is provided on one surface of the protruding portion 232a2 adjacent to the combustion chamber 112, and allows the mixed gas at the opposite side (II) of the combustion chamber 112 divided based on the moving member 232a to flow toward the side (I) of the combustion chamber 112 during the compression process. Accordingly, the covers 232a2" provided on the moving members 232a located at both left and right sides of the combustion chamber 112 are arranged to face each other.

With the structure, the unburned mixed gas existing at the opposite side (II) of the combustion chamber 112 flows toward the side (I) of the combustion chamber 112 through the air hole 232a2' during the compression process. In this instance, the cover 232a2" closing the air hole 232a2' is automatically open by the flow of the unburned mixed gas. However, unlike the basic control unit 132, the unburned gas partially generated at the side (I) of the combustion chamber 112 is restricted from flowing toward the opposite side (II) of the combustion chamber 112 due to the cover.

In this manner, the check valve type control unit 232 can much more reduce the amount of unburned gas generated than the basic control unit 132, and can execute a combustion similar to an actual constant volume combustion.

FIG. 20 illustrates conceptual views of operations of the combustion controller 130 during the compression and combustion processes. FIGS. 20(a) to 20(c) illustrate cases where the rotation angle of the rotor 120 is 160°, 170° and 180°, respectively. In the following description, the basic control unit 132 and the check valve type control unit 232 may all be applied to the combustion controller 130.

As illustrated, during the intake process and the compression process of the rotary engine 100, the moving member 132a protrudes by a preset length (e.g., 3-4 mm) from the inner wall of the housing 110 by the elastic supporting member 132b. The protruded length of the moving member 132a may vary according to an installation position of the combustion controller 130.

In this state, at a point where the compression process of the rotary engine 100 is ended and the combustion process is started (a point where the rotation angle of the rotor 120 is 160°), the outer surface 120a of the rotor 120 starts to be brought into contact with the moving member 132a.

As aforementioned, even though the moving member 132a is brought into contact with the rotor 120, mixed gas existing at the opposite side (II) of the combustion chamber 112 divided based on the moving member 132a flows toward the side (I) of the combustion chamber 112. In detail, in the basic control unit 132, the unburned mixed gas flows through the fine gaps formed between the intake-side housing cover 141 and the moving member 132a and between the exhaust-side housing cover 142 and the moving member 132a according to the pressure difference. On the other hand, in the check valve type control unit 232, the cover 232a2" selectively opens and closes the air hole 232a2' formed through the protruding portion 232a2 of the moving member 232a according to the pressure difference, and thus the unburned mixed gas existing at the opposite side (II) of the combustion chamber 112 flows toward the side (I) of the combustion chamber 112 through the air hole 232a2' during the compression process.

Afterwards, as the combustion process is ongoing, a gap between the outer surface 120a of the rotor 120 and the inner wall of the housing 110 is reduced, and accordingly the moving member 132a is gradually more pressed by the rotor 120. As being pressed, the moving member 132a is inserted into the accommodating groove 131a in the contact state with the rotor 120, in response to a compression of the elastic supporting member 132b, and then completely inserted into the accommodating groove 131a when the rotation angle of the rotor 120 is 180°.

FIG. 21 is a conceptual view illustrating operations of the combustion controller 130 during the combustion and expansion process. FIGS. 21(a) to 21(c) illustrate that the rotation angle of the rotor 120 is 180°, 190° and 200°, respectively.

As illustrated in FIG. 21, the moving member 132a which has been completely inserted in the accommodating groove 131a when the rotation angle of the rotor 120 is 180° protrudes from the accommodating groove 131a by elastic restoring force of the elastic supporting member 132a as the gap between the rotor 120 and the inner wall of the housing 110 increases. In this instance, the moving member 132a is moved in the contact state with the outer surface 120a of the rotor 120, similar to that during the combustion and compression processes (FIG. 20) of the rotary engine 100, and moved in the contact state with the outer surface 120a of the rotor 120 up to a point where the combustion of the rotary engine 100 is completely ended (a point where the rotation angle of the rotor 120 is approximately 200°).

At the completely ended time point of the combustion, similar to the state before starting the combustion process, the moving member 132a protrudes by the preset length from the inner wall of the housing 110, and is not moved any more due to the base portion 132a1 of the moving member 132a being locked on the inner side wall of the accommodating groove 131a.

As aforementioned, the moving member 132a is always maintained in the contact state with the outer surface 120a of the rotor 120 during the combustion process. Therefore, an internal surface area (associated with the stroke volume) of the housing 110 that comes in contact with the mixed gas during the combustion can be reduced and the amount of unburned gas generated can be reduced accordingly. Also, a variation of the stroke volume can be reduced, resulting in improving efficiency of the rotary engine 100.

The rotary engine 100 proposed in the present invention takes over the advantages of the existing rotary engine (Wankel engine), such as a simple structure, a small size, excellent rotation stability, low NOx emission and the like, and overcomes disadvantages, such as an emission of a large quantity of unburned gas according to a shape of an operation chamber (a wider surface area than a stroke volume) and low efficiency. Hereinafter, description will be given of advantages of the rotary engine 100, namely, minimization of an amount of unburned gas emitted and high performance.

FIG. 22 is a graph showing a variation of an area ratio in response to a variation of the rotation angle of the rotor 120 during a combustion period according to presence or absence of the combustion controller 130.

Unburned gas emitted from the rotary engine is generated as flames are spread along with mixed gas during a combustion process and extinguished near a wall surface of a housing. Specifically, the Wankel engine as the representative existing rotary engine is known as emitting a large quantity of unburned gas due to a shape of a stroke volume of such a long narrow engine (a wider surface area than the stroke volume).

However, the rotary engine 100 proposed in the present invention includes the control unit 132 that limits the stroke volume during the combustion process, as illustrated in FIGS. 20 and 21. Accordingly, the internal surface area corresponding to the stroke volume in which the combustion is executed can be reduced, thereby reducing the amount of unburned gas generated.

In the graph of FIG. 22, an x-axis denotes the rotation angle of the rotor 120 and a y-axis denotes a ratio of the internal surface area corresponding to the stroke volume, with respect to the stroke volume that varies according to the rotation angle of the rotor 120.

As can be seen in the graph, the general rotary engine generates a narrow long stroke volume during the combustion period, and thus the internal surface area corresponding to the stroke volume, with respect to the stroke volume, drastically increases, thereby generating much unburned gas. On the other hand, the rotary engine 100 according to the present invention limits the stroke volume by virtue of the combustion controller 130 during the combustion period and thus the internal surface area corresponding to the stroke volume can be less varied, thereby reducing the amount of unburned gas generated.

FIG. 23 is a graph showing a variation of a volume of the combustion chamber 112 in response to a variation of the rotation angle of the rotor 120 during a combustion period according to presence or absence of the combustion controller 130.

The rotary engine 100 according to the present invention can increase efficiency thereof by implementing an overexpansion effect of increasing an expansion ratio to be higher than a compression ratio owing to the positions of the intake port 124a and the exhaust port 124b, and a constant volume effect of constantly maintaining a volume of an operation chamber during a combustion period using the combustion controller 130.

In the graph of FIG. 23, an x-axis denotes the rotation angle of the rotor 120 and a y-axis denotes a ratio of the stroke volume, which varies according to the rotation angle of the rotor 120, with respect to a maximum volume of the operation chamber. As can be seen in the graph, the rotary engine 100 having the combustion controller 130 according to the present invention can cause a less change in the volume of the operation chamber during the combustion period, as compared with the general rotary engine without the combustion controller 130, thereby enabling an operation similar to a constant volume combustion.

FIG. 24 is a graph showing a P-V diagram of the rotary engine of FIG. 1A and a reciprocating engine.

The graph shows comparison results of performances of a general reciprocating engine and the rotary engine 100 proposed in the present invention under the same volume, compression ratio, heat input and combustion ratio of the combustion chamber 112 of the engine. In the graph, an x-axis denotes a volume change of the engine and a y-axis denotes a pressure change.

As shown in the graph, the rotary engine 100 according to the present invention exhibits more improved efficiency by about 4.4% than that of the general reciprocating engine, by virtue of the overexpansion effect resulting from a greater expansion ratio than the compression ratio. Also, the rotary engine 100 according to the present invention exhibits more improved efficiency by about 5.2% than the general reciprocating engine by virtue of the constant volume combustion effect that the volume of the operation chamber is almost constantly maintained during the combustion period. Therefore, it is expected that the efficiency of the rotary engine 100 according to the present invention is theoretically improved by about 9.6%, compared with the general reciprocating engine.

The efficiency improvement of the rotary engine 100 according to the present invention is expected by equally considering other losses (time loss, blow-down loss, etc.) which are generally caused in an engine. Therefore, an almost similar degree of effect can be expected even from an actual commercial engine.

FIG. 25 is a graph showing a P-V diagram of the rotary engine of FIG. 1A and a rotary engine from another company. Here, the rotary engine from another company is an engine disclosed in Korean Patent Laid-Open Publication No. 10-2014-0022029 titled "Cycloidal rotary engine." The rotary engine from the another company includes a piston inserted into and drawn out of a combustion chamber depending on a rotation angle of a rotor and a controller operating the piston, and configured to constantly maintain a combined volume of an operation chamber and the combustion chamber within a rotation angle range of the rotor.

Referring to the graph of FIG. 25, for the rotary engine from the another company, force pushing the piston is applied upon a compression with the same compression ratio, and thus an operation is more required. On the other hand, for the rotary engine 100 according to the present invention, the volume of the operation chamber can be automatically controlled by the moving member 132a and the elastic supporting member 132b, and in this case, an additional operation is not required to be performed. Therefore, it is expected that the rotary engine 100 according to the present invention can exhibit better efficiency than the rotary engine from the another company, and this can be confirmed from the graph.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A rotary engine, comprising:
    a housing having formed therein N lobe accommodating portions, where N is a natural number equal to or greater than 3, and combustion chambers in communication with respective ones of the lobe accommodating portions;
    a rotor having N−1 lobes that eccentrically centering on a center of the lobe accommodating portion, the N−1 lobes being consecutively accommodated in the respective lobe accommodating portions during the eccentric rotation; and
    combustion controllers provided at both sides of each combustion chamber, and configured to limit a region for combustion of mixed gas,
    wherein each of the combustion controllers includes
    a mounting portion formed within the housing and in communication with the corresponding lobe accommodating portion, and
    a control unit disposed in the mounting portion, wherein a portion of the control unit protrudes into the lobe accommodating portion and recedes into the mounting portion, the control unit being brought into contact with the lobe during compression and expansion processes to limit the region for combustion of the mixed gas,
    wherein the control unit includes a moving member disposed in the accommodating groove and having the portion of the control unit that protrudes into the lobe accommodating portion and recedes into the accommodating groove through the hole, the moving member being brought into contact with the lobe during the compression and expansion processes to limit the area for combustion of mixed gas, and wherein the moving member further includes:
    an air hole formed through the protruding portion; and
    a cover disposed on the protruding portion to selectively open and close the air hole according to a pressure difference.

2. The rotary engine of claim 1, wherein the mounting portion includes
    an accommodating groove that defines a space for accommodating the moving member therein, and
    a hole that extends between the accommodating groove and the lobe accommodating portion, wherein the portion of the moving member that protrudes into the lobe accommodating portion moves through the hole, the hole having a smaller cross section than the accommodating groove.

3. The rotary engine of claim 2, wherein the control unit includes
    an elastic supporting member supported on the accommodating groove and provided to elastically press the moving member toward the lobe accommodating portion.

4. The rotary engine of claim 3, wherein the moving member extends in a thickness direction of the rotor.

5. The rotary engine of claim 3, wherein the moving member includes
    a base portion formed in a plate-like shape that abuts against an inner side wall of the accommodating groove when the moving member is fully extended in response to being pressed by the elastic supporting member, and
    a protruding portion that protrudes from the base portion, the protruding portion protruding into the lobe accommodating portion and inserted into the accommodating groove through the hole.

6. The rotary engine of claim 5, wherein the elastic supporting member is interposed between the base portion and an inner side surface of the accommodating groove to elastically support the moving member.

7. The rotary engine of claim 6, wherein the elastic supporting member is a plate spring formed in a shape that is convex toward the base portion.

8. The rotary engine of claim 1, wherein the cover is disposed on one surface of the protruding portion, adjacent to the combustion chamber, such that mixed gas present at a side of the control unit opposite the combustion chamber flows toward the combustion chamber during the compression process.

9. The rotary engine of claim 1, further comprising:
    an intake-side housing cover coupled to the housing to cover one side of each of the lobe accommodating portions and connected to an intake manifold through which the mixed gas is introduced; and
    an exhaust-side housing cover coupled to the housing to cover another side of each of the lobe accommodating portions and connected to an exhaust manifold through which exhaust gas is discharged,
    wherein the mixed gas present at a side of the control unit opposite the combustion chamber flows toward the combustion chamber through a gap between the intake-side housing cover and the moving member and a gap between the exhaust-side housing cover and the moving member during the compression process.

10. The rotary engine of claim 9, further comprising:
a guide gear fixed to the intake-side housing cover to guide the eccentric rotation of the rotor;
a rotor gear disposed on the rotor and rotatable while internally engaged with the guide gear; and
a crankshaft disposed eccentric from a central portion of the rotor to transfer generated driving force.

11. The rotary engine of claim 1, wherein an outer shape of the rotor has an epitrochoidal curve that is a curve drawn by an arbitrary point at a position spaced apart from a center of a rolling circle with a radius of r by a distance E while the rolling circle rolls along an outer circumference of a base circle with a radius of R, and
wherein the outer shape of the rotor is determined by the equation:

$$Ro(\alpha) = \begin{bmatrix} R(\alpha)\sin(\theta(\alpha)) \\ R(\alpha)\cos(\theta(\alpha)) \\ 1 \end{bmatrix}$$

$$\theta(\alpha) = \tan^{-1}\left(\frac{E\sin(N\alpha) + R_L\sin(\alpha)}{E\cos(N\alpha) + R_L\cos(\alpha)}\right)$$

$$R(\alpha) = \sqrt{(E\cos(3\alpha) + R_L\cos(\alpha))^2 + (E\sin(3\alpha) + R_L\sin(\alpha))^2}$$

where $\theta(\alpha)$ denotes a rotated angle of the arbitrary point centering on a y-axis setting the center of the base circle as an origin of a coordinate axis, $\alpha$ denotes a rotated angle of the center of the rolling circle centering on the y-axis, $R(\alpha)$ denotes a distance between the center of the base circle and the arbitrary point, $R_L$ denotes R+r, and N=(R+r)/r.

12. The rotary engine of claim 11, wherein $R_L/E$ is equal to or greater than 6 ($R_L/E=6$), where a distance between the center of the rotor and the center of the lobe accommodating portion is E, and a distance between the center of the rotor and an outer surface of the rotor spaced the farthest apart from the center of the rotor.

13. The rotary engine of claim 1, wherein a first storage portion for temporarily storing introduced mixed gas is formed in a front portion of the rotor,
wherein a second storage portion for temporarily storing exhaust gas generated after combustion is formed in a rear portion of the rotor, and
wherein an intake port and an exhaust port are formed through a side portion of the rotor, the intake port is in communication with the first storage portion such that the introduced mixed gas is introduced into the first storage portion, and the exhaust port is in communication with the second storage portion such that the exhaust gas generated after the combustion is introduced into the second storage portion.

14. The rotary engine of claim 13, wherein the exhaust port is located at a position where introduced gas is exhausted after being expanded to a greater amount.

15. The rotary engine of claim 14, wherein the value of N is 3.

16. The rotary engine of claim 15, wherein one of the lobes of the rotor is accommodated in each of the lobe accommodating portions when the rotor rotates by 0°, 120° and 240°,
wherein the intake port is located at a position where the mixed gas is introduced while the rotor rotates by 120°, and
wherein the exhaust port is located at a position where the exhaust gas is exhausted after the rotor rotates by 270° to allow an overexpansion.

17. The rotary engine of claim 15, wherein the control unit is brought into contact with the lobe while the rotor eccentrically rotates in the range of 160° to 200°, wherein a position of the lobe at top dead center of a respective lobe accommodating portion is defined as 180°.

18. A rotary engine, comprising:
a housing provided therein with N lobe accommodating portions, where N is a natural number equal to or greater than 3, combustion chambers in communication with respective ones of the lobe accommodating portions, and mounting portions provided at both sides of each combustion chamber and in communication with the lobe accommodating portion corresponding to the combustion chamber;
a rotor having N−1 lobes that each eccentrically rotate centering on a center of the lobe accommodating portion, the N−1 lobes being consecutively accommodated in the respective lobe accommodating portions during the eccentric rotation;
an intake-side housing cover coupled to the housing to cover one side of each of the lobe accommodating portions and having an intake hole for introduction of mixed gas;
an intake manifold coupled to the intake-side housing cover in communication with the intake hole, the intake manifold allowing the introduction of the mixed gas;
an exhaust-side housing cover coupled to the housing to cover another side of each of the lobe accommodating portions and having an exhaust hole for discharging exhaust gas;
an exhaust manifold coupled to the exhaust-side housing cover in communication with the exhaust hole, the exhaust manifold allowing the discharge of the exhaust gas;
a guide gear fixed to the intake-side housing cover to guide the eccentric rotation of the rotor;
a rotor gear disposed on the rotor and rotating while internally engaged with the guide gear;
a crankshaft disposed eccentric from a central portion of the rotor to transfer generated driving force; and
a control unit provided in each of the mounting portions, wherein each of the control units is configured to move between a lobe accommodating portion and a corresponding mounting portion, the control units being moved in a reciprocating manner and brought into contact with the lobe during compression and expansion processes to limit a region for combustion of the mixed gas.

19. A rotary engine, comprising:
a housing provided therein with N lobe accommodating portions, where N is a natural number equal to or greater than 3, and combustion chambers in communication with respective ones of the lobe accommodating portions;
a rotor having N−1 lobes that each eccentrically rotate centering on a center of the lobe accommodating portion, the N−1 lobes consecutively accommodated in the lobe accommodating portions during the eccentric rotation; and
combustion controllers provided at opposite sides of each of the combustion chambers to change an area, between the housing and the rotor around each combustion chamber, for combustion of mixed gas, wherein the mounting portion includes:

an accommodating groove that defines a space for accommodating the control unit therein; and a hole that extends between the accommodating groove and the lobe accommodating portion, wherein the portion of the control unit that protrudes into the lobe accommodating portion moves through the hole, the hole having a smaller cross section than the accommodating groove, wherein the control unit includes:

a moving member disposed in the accommodating groove and having the portion of the control unit that protrudes into the lobe accommodating portion and recedes into the accommodating groove through the hole, the moving member being brought into contact with the lobe during the compression and expansion processes to limit the area for combustion of mixed gas; and an elastic supporting member supported on the accommodating groove and provided to elastically press the moving member toward the lobe accommodating portion, wherein the moving member includes:

a base portion formed in a plate-like shape that abuts again an inner side wall of the accommodating groove when the moving member is fully extended in response to being pressed by the elastic supporting member; and a protruding portion that protrudes from the base portion, the protruding portion protruding into the lobe accommodating portion and inserted into the accommodating groove through the hole, and wherein the moving member further includes:

an air hole formed through the protruding portion; and a cover disposed on the protruding portion to selectively open and close the air hole according to a pressure difference.

\* \* \* \* \*